(12) United States Patent
Yan et al.

(10) Patent No.: US 8,338,555 B2
(45) Date of Patent: *Dec. 25, 2012

(54) PHOTOPOLYMERS AND THEIR USE IN ORGANIC THIN FILM TRANSISTORS

(75) Inventors: He Yan, Skokie, IL (US); Antonio Facchetti, Chicago, IL (US); Tobin J. Marks, Evanston, IL (US)

(73) Assignee: Polyera Corporation, Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,083

(22) Filed: Jul. 14, 2011

(65) Prior Publication Data

US 2011/0266534 A1 Nov. 3, 2011

Related U.S. Application Data

(63) Continuation of application No. 11/998,159, filed on Nov. 28, 2007, now Pat. No. 7,981,989.

(60) Provisional application No. 60/861,308, filed on Nov. 28, 2006.

(51) Int. Cl.
| | |
|---|---|
| C08F 22/10 | (2006.01) |
| C08F 12/20 | (2006.01) |
| C08F 12/22 | (2006.01) |
| C08F 12/18 | (2006.01) |
| C08F 118/02 | (2006.01) |
| C08F 222/10 | (2006.01) |

(52) U.S. Cl. ........ 526/321; 526/242; 526/244; 526/245; 526/251; 526/319; 526/326

(58) Field of Classification Search .................. 526/321, 526/242, 244, 245; 522/121, 153
See application file for complete search history.

(56) References Cited

U.S. PATENT DOCUMENTS

| | | | |
|---|---|---|---|
| 5,223,356 A | 6/1993 | Kumar et al. .................. 430/1 |
| 5,998,101 A | 12/1999 | Park et al. | |
| 6,258,507 B1 | 7/2001 | Ochiai et al. ............... 430/270.1 |
| 6,380,271 B1 | 4/2002 | Enoki et al. .................. 521/77 |
| 6,458,310 B1 | 10/2002 | Liu ............................. 264/425 |
| 7,029,945 B2 | 4/2006 | Veres et al. .................. 438/99 |
| 7,098,525 B2 | 8/2006 | Bai et al. ................... 257/642 |
| 7,270,845 B2 | 9/2007 | Japp et al. | |
| 2004/0065929 A1 | 4/2004 | Koo et al. ................... 257/410 |
| 2004/0211989 A1 | 10/2004 | Armgarth et al. ............ 257/253 |
| 2004/0216641 A1 | 11/2004 | Hamada et al. ........... 106/287.16 |
| 2005/0001210 A1 | 1/2005 | Lee et al. ................... 257/40 |
| 2005/0019592 A1 | 1/2005 | Bai et al. ................... 428/461 |
| 2005/0176970 A1 | 8/2005 | Marks et al. ................. 549/41 |
| 2006/0186401 A1 | 8/2006 | Marks et al. ................. 257/40 |
| 2006/0202195 A1 | 9/2006 | Marks et al. ................. 257/40 |
| 2007/0282094 A1 | 12/2007 | Marks et al. | |
| 2008/0021220 A1 | 1/2008 | Marks et al. | |
| 2008/0161464 A1 | 7/2008 | Marks et al. | |
| 2010/0019237 A1 | 1/2010 | Marks et al. | |

FOREIGN PATENT DOCUMENTS

| | | |
|---|---|---|
| EP | 1 494 298 A2 | 1/2005 |
| EP | 1 541 118 A1 | 6/2005 |
| GB | 1 517 746 | 7/1978 |

OTHER PUBLICATIONS

Yan Hu et al., Phototransistor Properties of Pentacene Organic Transistors with Poly(methyl methyacryalte) Dielectirc Layer, 2006, Japanese Journal of Applied Physics, vol. 45, L96-L98.*

Nishikubo et al., Study of Photopolymer. XVII. Synthesis of Novel Photosensitive Polymers with Pendant Photosensitive Group and Photosensitizer Groups, 1983, Journal of Polymer Science, vol. 21, 2025-2045.*

Ali et al., "Photoresponsive Functionalized Vinyl Cinnamate Polymers: Synthesis and Characterization," *Polymer International*, 43:310-316 (1997).

Balaji et al., "Studies on photocrosslinkable polymers having bromo-substituted pendant cinnamoyl group," *Reactive & Functional Polymers*, 56:45-57 (2003).

Chae et al., "Photoreaction and Molecular Reorientation in a Nanoscaled Film of Poly(methyl 4-(methacryloyloxy)cinnamate) Studied by Two-Dimensional FTIR and UV Correlation Spectroscopy," *Langmuir*, 19:687-695 (2003).

Ding et al., "Polyisoprene-*block*-poly(2-cinnamoylethyl methacrylate) Vesicles and Their Aggregates," *Macromolecules*, 30:655-657 (1997).

Ding et al., "Polystyrene-*block*-poly(2-cinnamoylethyl methacrylate) Nanospheres with Cross-Linked Shells," *Macromolecules*, 31:6554-6558 (1998).

Facchetti et al., "Gate Dielectrics for Organic Field-Effect Transistors: New Opportunities for Organic Electronics," *Adv. Mater.*, 2005: 17, 1705-1725.

Hanemann et al., "Novel Photocrosslinkable Systems for Nonlinear Optics," *Adv. Mater.*, 7(5):465-468 (1995).

Henselwood et al., "Water-Soluble Porous Nanospheres," *Macromolecules*, 31:4213-4217 (1998).

Hoppenbrouwers et al., "Triblock Nanospheres with Amphiphilic Coronal Chains," *Macromolecules*, 36:876-881 (2003).

Hu et al., "Phototransistor Properties of Pentacene Organic Transistors with Poly(methyl methacrylate) Dielectric Layer," *Japanese Journal of Applied Physics*, 45(3):L96-L98 (2006).

Kang et al., "Humidity-dependent characteristics of thin film poly(3,4-ethylenedioxythiophene) field-effect transistor," *Synthetic Metals*, 155:176-179 (2005).

Kawatsuki et al., "Coplanar alignment of mesogenic moieties in a photocrosslinked liquid crystalline polymer film containing cinnamoyl groups," *Applied Physics Letters*, 75(10):1386-1388 (1999).

Kawatsuki et al., "Influence of substituents on the reorientational behavior in photocrosslinkable polymer liquid crystal films with *p*-substituted cinnamoyloxybiphenyl side groups by irradiating with linearly polarized ultraviolet light and annealing," *Polymer*, 45:2615-2621 (2004).

(Continued)

*Primary Examiner* — Ling Choi
*Assistant Examiner* — Monique Peets
(74) *Attorney, Agent, or Firm* — Karen K. Chan

(57) ABSTRACT

Photopolymers are provided with composites and electronic devices including such photopolymers. Specifically, organic thin film transistors comprising a semiconductor layer, a polymeric layer in contact with the semiconductor layer, a gate electrode, a source electrode and a drain electrode are disclosed, wherein the semiconductor layer comprises an organic semiconductor compound, and the polymeric layer comprises a photocrosslinked product of a photopolymer.

10 Claims, 19 Drawing Sheets

OTHER PUBLICATIONS

Kawatsuki et al., "Photoreaction of Photo-cross-linkable Methacrylate Polymer Films Comprising 2-Cinnamoyloxyethoxybiphenyl Side Group by Linearly Polarized Ultraviolet Light and Liquid Crystal Alignment on the Resultant Films," *Chem. Mater.*, 12:1549-1555 (2000).

Kim et al., "Preparations and Oil Absorptivities of Poly(stearyl methacrylate-*co*-cinnamoyloxyethyl methacrylate) and PET Nonwoven Fiber Photocrosslinked with It," *Journal of Applied Polymer Science*, 73:2349-2357 (1999).

Lee et al., "All-Polymer FET Based on Simple Photolithographic Micro-Patterning of Electrically Conducting Polymer," *Mol. Cryst. Liq. Cryst.*, 405:171-178 (2003).

Lee et al., "Effects of hydroxyl groups in polymeric dielectrics on organic transistor performance," *Applied Physics Letters*, 88:162109-1-162109-3 (2006).

Lee et al., "Flexible all-polymer field effect transistors with optical transparency using electrically conducting polymers," *Thin Solid Films*, 477:169-173 (2005).

Liu et al., "Diblock Thin Films With Regularly Packed Nanochannels," *American Chemical Society*, 40(2):982-983 (1999).

Liu et al., "Enabling Gate Dielectric Design for All Solution-Processed, High-Performance, Flexible Organic Thin-Film Transistors," *J. Am. Chem. Soc.*, 128:4554-4555 (2006).

Liu et al., "First- and Zero-Order Kinetics of Porogen Release from the Cross-Linked Cores of Diblock Nanospheres," *Macromolecules*, 36:5279-5284 (2003).

Nishikubo, "Study of photopolymer XVII. Synthesis of novel photosensitive polymers with pendant photosensitive group and photosensitizers groups," *J. of Polymer Science*, 21:2025-2045 (1983).

Park et al., "Grafting of Polycaprolactone onto Poly(ethylene-co-vinyl alcohol) and Application to Polyethylene-based Bioerodable Blends," *J. Polym. Sci. B: Polym. Phys.*, 2002: 40(22), 2561-2569.

Park et al., "Synthesis and application of terpolymer bearing cyclic carbonate and cinnamoyl groups," *Optical Materials*, 21:331-335 (2002).

Park et al., "Synthesis of Photopolymers with Pendant Cyclic Carbonate and Cinnamic Ester Groups," *React. Kinet. Catal. Lett.*, 79(2):245-255 (2003).

Stadlober et al., "High-mobility pentacene organic field-effect transistors with a high-dielectric-constant fluorinated polymer film gate dielectric," *Applied Physics Letters*, 86:242902-1-242902-3 (2005).

Xia et al., "Electrochemical characteristics of dip-coated poly (2-cinnamoylethyl methacrylate) (PCEMA) films on Au surfaces," *Electrochimica Acta*, 46:463-474 (2000).

Xia et al., "Properties of thin polystyrene-poly(2-cinnamoylethyl methacrylate) (PS-PCEMA) copolymeric coatings on gold electrodes," *Electrochimica Acta*, 46:475-485 (2000).

Yan et al., "Organic field-effect transistors based on a crosslinkable polymer blend as the semiconducting layer," *Applied Physics Letters*, 2005: 87, 183501-1-183501-3.

Yoon et al., "Low-Voltage Organic Field-Effect Transistors and Inverters Enabled by Ultrathin Cross-linked Polymers as Gate Dielectrics," *J. Am. Chem. Soc.*, 2005: 127, 10388-10395.

\* cited by examiner

Transfer plot

Output plot

Transfer plot

Output plot

Transfer plot

Output plot

Transfer plot

Output plot

Before UV treatment

After UV treatment

Transfer plot

Output plot

Transfer plot

Output plot

PHOTOPOLYMERS AND THEIR USE IN ORGANIC THIN FILM TRANSISTORS

CROSS REFERENCE TO RELATED APPLICATION

This application is a continuation of U.S. patent application Ser. No. 11/998,159, filed on Nov. 28, 2007, which claims priority to and the benefit of U.S. Provisional Patent Application Ser. No. 60/861,308, filed on Nov. 28, 2006, the disclosure of each of which is incorporated by reference herein in its entirety.

INTRODUCTION

The development of polymeric dielectric materials has been fundamental for the progress of organic electronic devices. In particular, emerging display and identification/tracking/labeling technologies based on organic thin-film transistors (OTFTs), such as electronic paper and radiofrequency identification (RFID) devices, require fabrication of OTFTs on plastic, paper, or other flexible substrates over very large areas and via high throughput processes. Therefore, there has been considerable effort in developing new materials for OTFT components (semiconductor, dielectric, and contacts) which can be deposited via solution-processing methods such as spin-coating, casting, and printing.

Although various polymers have been employed as dielectrics for OTFTs, several limitations of current-generation polymeric dielectric-based OTFTs exist. First, the leakage current densities of conventional polymeric dielectric films are relatively high (usually $>1\times10^{-7}$ A/cm$^2$ at 2 MV/cm, $>>1\times10^{-5}$ A/cm$^2$ at 4 MV/cm). Second, very few polymeric dielectric materials are sufficiently soluble to be solution-processed, especially via inexpensive printing techniques. Among those that are solution-processable, they often cannot survive the conditions used in subsequent solution-processing steps (e.g., for TFT device fabrication, the deposition of overlying layers such as the semiconductor layer (for bottom-gate devices), the conductor layer, and the passive layers), hence their application in device fabrication is significantly limited. Third, currently available polymeric dielectric materials often fail to achieve a sub-nanometer/nanometer surface smoothness, which is a prerequisite for stable TFT performance and operation.

To address these issues, crosslinkable polymeric dielectrics such as crosslinked melamine/Cr$^{6+}$ salts-polyvinylphenol (PVP) and crosslinked benzocyclobutene (BCB) have been introduced. However, these polymer films require high annealing temperatures and their leakage current densities are usually higher than $10^{-7}$ A/cm$^2$ at 2 MV/cm. The high current leakage densities of these polymeric dielectrics are believed to be due to, among other factors, the hydrophilic nature of phenol-based polymers and the presence of crosslinker additives.

On the other hand, polymers with a hydrophobic backbone such as poly(methylmethacrylate) (PMMA) and polystyrene offer the possibility of achieving much lower TFT gate leakage current densities and greater environmental stability. These hydrophobic polymers are often soluble in common organic solvents but, because of the lack of crosslinking functionality, they cannot withstand subsequent solution-phase processing steps in which additional layers are deposited.

Accordingly, there is a desire in the art for crosslinkable polymeric dielectric materials that can exhibit low current leakage densities, that can be prepared via solution processes, that can be air- and/or moisture-stable, and that can be compatible with diverse gate and/or semiconductor materials.

SUMMARY

In light of the foregoing, the present teachings provide photopolymer-based dielectric materials (e.g. films) and associated devices that can address various deficiencies and shortcomings of the prior art, including those outlined above.

In one aspect, the present teachings provide photopolymers that can be used to prepare dielectric materials. Among other desirable properties, polymers of the present teachings can be soluble in common organic solvents but can become insoluble in the same solvents after undergoing crosslinking, for example, photocrosslinking, which gives rise to certain processing advantages. More specifically, the present teachings provide polymers having crosslinkable functional groups, for example, photocrosslinkable functional groups, that allow the polymers to crosslink. The crosslinking functionality can allow formation of a densely crosslinked polymeric matrix. Photopolymers of the present teachings and their crosslinked products can have excellent insulating properties, which enable their use as dielectrics. In some embodiments, the photopolymers and their crosslinked products can have a leakage current density that is less than or equals to about $1\times10^{-8}$ A/cm$^2$ at 2 MV/cm.

Polymers of the present teachings can have a pendant group having the formula:

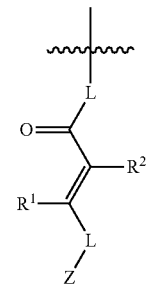

wherein $R^1$, $R^2$, L, and Z are as defined herein. In certain embodiments, the present teachings provide polymers having the formula:

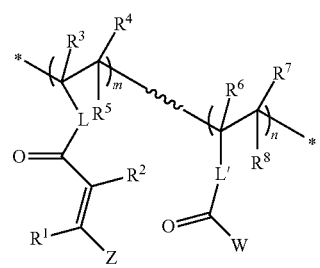

wherein $R^1$, $R^2$, $R^3$, $R^4$, $R^5$, $R^6$, $R^7$, $R^8$, L, L', W, Z, m, and n are as defined herein.

The present teachings also provide dielectric materials that include the polymers described above. For example, the dielectric materials can be prepared from the polymers described above. Multilayer dielectric materials are provided which include two or more layers of dielectric materials sequentially deposited on top of each other, where at least one of the layers is prepared from polymers of the present teachings. These photopolymers can be used to prepare dielectric materials using various solution processes, including various printing techniques.

The present teachings further provide electronic devices that include or are made from any of the dielectric materials described above. Examples of electronic devices include, but are not limited to, organic thin film transistors (OTFTs) (e.g., organic field effect transistors (OFETs)) and capacitors. In addition to a dielectric component, these devices can include, for example, a substrate component, a semiconductor component, and/or a metallic contact component.

Methods for preparing the polymers, the dielectric materials, and the electronic devices described above are also provided and are within the scope of the present teachings.

The foregoing as well as other features and advantages of the present teachings will be more fully understood from the following figures, description, and claims.

BRIEF DESCRIPTION OF THE DRAWINGS

It should be understood that the drawings described below are for illustration purposes only and are not necessarily to scale. The drawings are not intended to limit the scope of the present teachings in any way.

DETAILED DESCRIPTION

Figure 1:
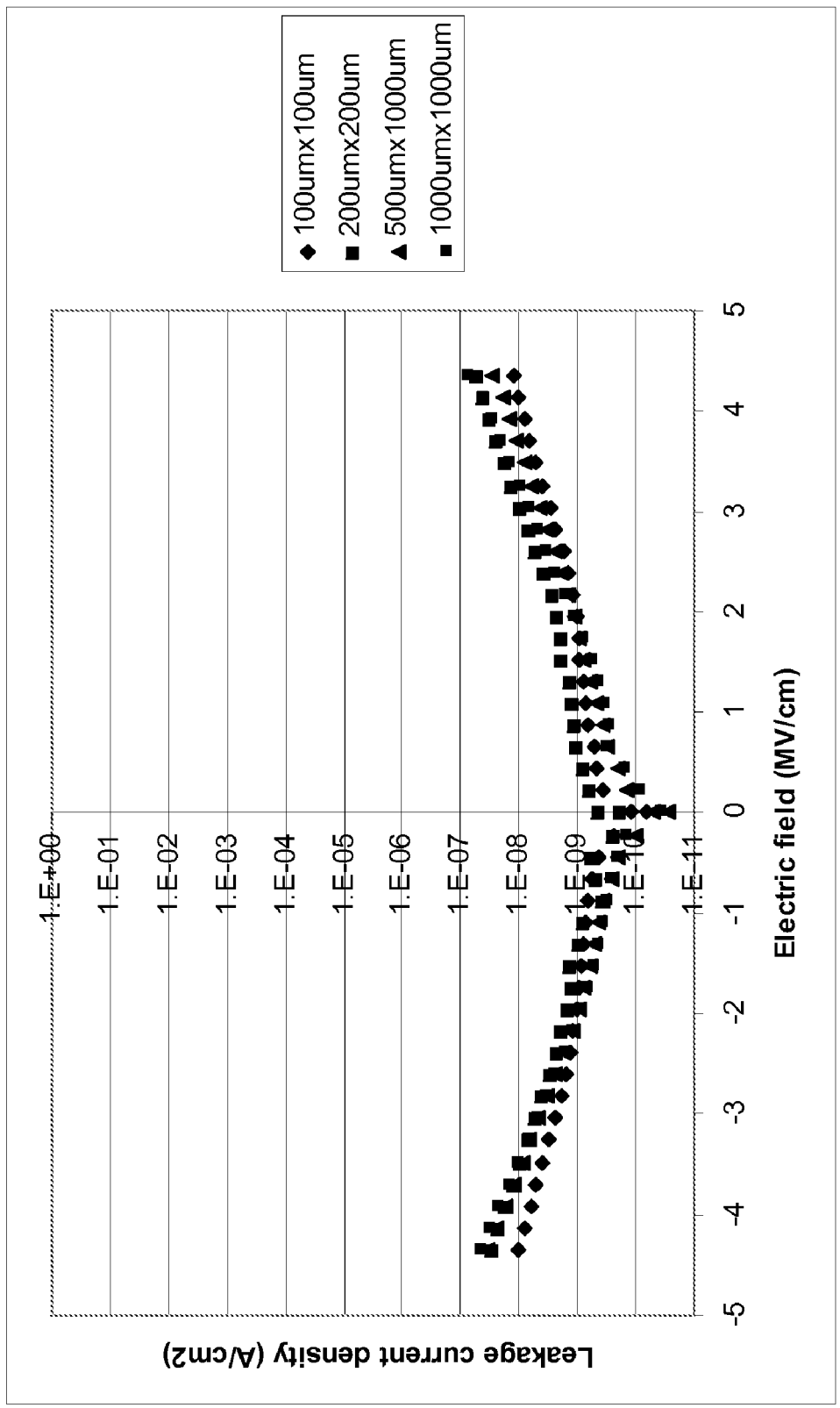
FIG. 1 provides leakage current density (J) versus electric field (E) plots of various metal-insulator-semiconductor capacitor structures of different feature sizes in which the insulating layer is a dielectric material of the present teachings [P(CyVP$_{0.55}$-co-MMA$_{0.45}$)].

The present teachings relate to photopolymers that can be used to prepare dielectric materials, the dielectric materials so prepared, methods for preparing the photopolymers and the dielectric materials, as well as to compositions, articles, structures, and devices that include such photopolymers and dielectric materials.

More specifically, the present teachings provide solution-processable polymers that can be crosslinked, for example, photocrosslinked, to provide insoluble robust dielectric materials that can exhibit excellent insulating properties and can be used to fabricate various organic electronic devices, including OTFTs. The dielectric materials also can be air-stable and have long shelf stability, and can be compatible with a wide range of p-type and n-type organic and inorganic semiconductors, making them attractive materials for fabricating various organic electronic devices.

Throughout the description, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

As used herein, "polymer" or "polymeric compound" refers to a molecule consisting of at least two repeating units (monomers) connected by covalent chemical bonds. The polymer or polymeric compound can have only one type of repeating unit as well as two or more types of different repeating units. In the latter case, the term "copolymer" or "copolymeric compound" can be used instead, especially when the polymer includes chemically significantly different repeating units. A polymer typically comprises a backbone with optional pendant groups. Unless specified otherwise, the assembly of the repeating units in the copolymer can be head-to-tail, head-to-head, or tail-to-tail. In addition, unless specified otherwise, the copolymer can be a random copolymer, an alternating copolymer, or a block copolymer. In some embodiments, formulae similar to the ones below can be used to represent a copolymer, and such formula should be interpreted to embrace a copolymer having any repeating pattern consisting of x % of $Q^1$, y % of $Q^2$, and z % of $Q^3$, where $Q^1$, $Q^2$, and $Q^3$ are different repeating units:

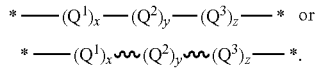

As used herein, a "pendant group" refers to a moiety that is substituted on the backbone of a polymer.

As used herein, "photopolymer" refers to a polymer that can be cured, for example, crosslinked, by exposure to light, often in the ultraviolet region of the spectrum, or other types of radiation.

As used herein, "solution-processable" refers to compounds, materials, or compositions that can be used in various solution-phase processes including, but not limited to, spin-coating, printing (e.g., inkjet printing), spray coating, electrospray coating, drop casting, dip coating, and blade coating.

As used herein, "halo" or "halogen" refers to fluoro, chloro, bromo, and iodo.

As used herein, "amino" refers to —$NH_2$, an —NH-alkyl group, an —$N(alkyl)_2$ group, an —NH-arylalkyl group, an —N(alkyl)-arylalkyl group, and an —$N(arylalkyl)_2$ group, and is within the definition of —$NR^1R^2$, wherein $R^1$ and $R^2$ are as defined herein.

As used herein, "alkoxy" refers to —O-alkyl group, and is within the definition of —$OR^3$, wherein $R^3$ is as defined herein. Examples of alkoxy groups include, but are not limited to, methoxy, ethoxy, propoxy (e.g., n-propoxy and iso-propoxy), t-butoxy groups, and the like.

As used herein, "alkylthio" refers to an —S-alkyl group. Examples of alkylthio groups include, but are not limited to, methylthio, ethylthio, propylthio (e.g., n-propylthio and iso-propylthio), t-butylthio groups, and the like.

As used herein, "ester" refers to both an —O—C(O)-alkyl group and a —C(O)—O-alkyl group, where the former group is within the definition of —$OC(O)R^3$, and $R^3$ is as defined herein.

As used herein, "oxo" refers to a double-bonded oxygen (i.e., =O).

As used herein, "alkyl" refers to a straight-chain or branched saturated hydrocarbon group. Examples of alkyl groups include methyl (Me), ethyl (Et), propyl (e.g., n-propyl and isopropyl), butyl (e.g., n-butyl, isobutyl, sec-butyl, tert-butyl), pentyl groups (e.g., n-pentyl, isopentyl, neopentyl), and the like. In various embodiments, an alkyl group can have 1 to 30 carbon atoms, i.e., a $C_{1-30}$ alkyl group, and, for example, an alkyl group can have 1 to 20 carbon atoms, i.e., a $C_{1-20}$ alkyl group. In some embodiments, an alkyl group can have 1 to 6 carbon atoms, and can be referred to as a "lower alkyl group." Examples of lower alkyl groups include methyl, ethyl, propyl (e.g., n-propyl and isopropyl), and butyl groups (e.g., n-butyl, isobutyl, sec-butyl, tert-butyl). In some embodiments, alkyl groups can be substituted as disclosed herein.

As used herein, "haloalkyl" refers to an alkyl group having one or more halogen substituents. Examples of haloalkyl groups include, but are not limited to, $CF_3$, $C_2F_5$, $CHF_2$, $CH_2F$, $CCl_3$, $CHCl_2$, $CH_2Cl$, $C_2Cl_5$, and the like. Perhaloalkyl groups, i.e., alkyl groups wherein all of the hydrogen atoms are replaced with halogen atoms (e.g., $CF_3$ and $C_2F_5$), are included within the definition of "haloalkyl." For example, a $C_{1-20}$ haloalkyl group can have the formula —$C_nX_{2n+1}$ or —$C_nH_{2n+1-t}X_t$, wherein X is F, Cl, Br, or I, n is an integer in the range of 1 to 20, and t is an integer in the range of 0 to 41, provided that t is less than or equal to 2n+1.

As used herein, "alkenyl" refers to a straight-chain or branched alkyl group having one or more carbon-carbon double bonds. Examples of alkenyl groups include, but are not limited to, ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 20 carbon atoms, i.e., a $C_{2-20}$ alkenyl group. In some embodiments, alkenyl groups can be substituted as disclosed herein.

As used herein, "alkynyl" refers to a straight-chain or branched alkyl group having one or more triple carbon-carbon bonds. Examples of alkynyl groups include, but are not limited to, ethynyl, propynyl, butynyl, pentynyl, and the like. The one or more triple carbon-carbon bonds can be internal (such as in 2-butyne) or terminal (such as in 1-butyne). In various embodiments, an alkynyl group can have 2 to 20 carbon atoms, i.e., a $C_{2-20}$ alkynyl group. In some embodiments, alkynyl groups can be substituted as disclosed herein.

As used herein, "cycloalkyl" refers to a non-aromatic carbocyclic group including cyclized alkyl, alkenyl, and alkynyl groups. A cycloalkyl group can be monocyclic (e.g., cyclohexyl) or polycyclic (e.g., containing fused, bridged, and/or spiro ring systems), wherein the carbon atoms are located inside or outside of the ring system. Any suitable ring position of the cycloalkyl group can be covalently linked to the defined chemical structure. Examples of cycloalkyl groups include, but are not limited to, cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcaryl, adamantyl, and spiro[4.5]decanyl groups, as well as their homologs, isomers, and the like. In various embodiments, a cycloalkyl group can have 3 to 14 carbon atoms, including 3 to 10 carbon atoms (i.e., a $C_{3-10}$ cycloalkyl group). In some embodiments, cycloalkyl groups can be substituted as disclosed herein.

As used herein, "heteroatom" refers to an atom of any element other than carbon or hydrogen and includes, for example, nitrogen, oxygen, silicon, sulfur, phosphorus, and selenium.

As used herein, "cycloheteroalkyl" refers to a non-aromatic cycloalkyl group that contains at least one ring heteroatom selected from O, N, and S, and optionally contains one or more double or triple bonds. In various embodiments, a cycloheteroalkyl group can have 3 to 20 ring atoms, including 3 to 14 ring atoms (i.e., a 3-14 membered cycloheteroalkyl group). One or more N or S atoms in a cycloheteroalkyl ring may be oxidized (e.g., morpholine N-oxide, thiomorpholine S-oxide, thiomorpholine S,S-dioxide). In some embodiments, nitrogen atoms of cycloheteroalkyl groups can bear a substituent, for example, a hydrogen atom, an alkyl group, or other substituents as described herein. Cycloheteroalkyl groups can also contain one or more oxo groups, such as oxopiperidyl, oxooxazolidyl, dioxo-(1H,3H)-pyrimidyl, oxo-2(1H)-pyridyl, and the like. Examples of cycloheteroalkyl groups include, among others, morpholinyl, thiomorpholinyl, pyranyl, imidazolidinyl, imidazolinyl, oxazolidinyl, pyrazolidinyl, pyrazolinyl, pyrrolidinyl, pyrrolinyl, tetrahydrofuranyl, tetrahydrothiophenyl, piperidinyl, piperazinyl, and the like. In some embodiments, cycloheteroalkyl groups can be substituted as disclosed herein.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have from 6 to 14 carbon atoms in its ring system, which can include multiple fused rings. In some embodiments, a polycyclic aryl group can have from 7 to 14 carbon atoms. Any suitable ring position of the aryl group can be covalently linked to the defined chemical structure. Examples of aryl groups having only aromatic carbocyclic ring(s) include, but are not limited to, phenyl, 1-naphthyl (bicyclic), 2-naphthyl (bicyclic), anthracenyl (tricyclic), phenanthrenyl (tricyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include, but are not limited to, benzodioxanyl, benzodioxolyl, chromanyl, indolinyl groups, and the like. In some embodiments, aryl groups can be substituted with up to five substitution groups as disclosed herein. For example, an aryl group can be substituted with one to five halogen substituents and such an aryl group can be referred to as a "haloaryl" group. An example of a haloaryl group is a perhalophenyl group, where the phenyl group is substituted with five halogen atoms.

As used herein, "heteroaryl" refers to an aromatic monocyclic ring system containing at least 1 ring heteroatom selected from oxygen (O), nitrogen (N), and sulfur (S) or a polycyclic ring system where at least one of the rings present in the ring system is aromatic and contains at least 1 ring heteroatom. Polycyclic heteroaryl groups include two or more heteroaryl rings fused together and monocyclic heteroaryl rings fused to one or more aromatic carbocyclic rings (aryl groups), non-aromatic carbocyclic rings (cycloalkyl groups), and/or non-aromatic cycloheteroalkyl groups. A heteroaryl group, as a whole, can have, for example, from 5 to 14 ring atoms and contain 1-5 ring heteroatoms. The heteroaryl group can be attached to the defined chemical structure at any heteroatom or carbon atom that results in a stable structure. Generally, heteroaryl rings do not contain O—O, S—S, or S—O bonds. However, one or more N or S atoms in a heteroaryl group can be oxidized (e.g., pyridine N-oxide, thiophene S-oxide, thiophene S,S-dioxide). Examples of heteroaryl groups include, for example, the 5-membered monocyclic and 5-6 bicyclic ring systems shown below:

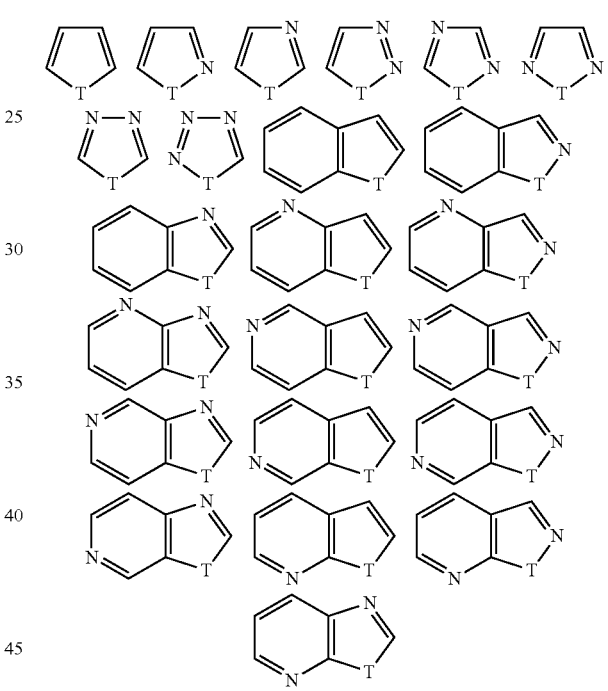

where T is O, S, NH, N-alkyl, N-aryl, or N-(arylalkyl) (e.g., N-benzyl). Examples of heteroaryl groups include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl, and the like. Further examples of heteroaryl groups include, but are not limited to, 4,5,6,7-tetrahydroindolyl, tetrahydroquinolyl, benzothienopyridyl, benzofuropyridyl, and the like. In some embodiments, heteroaryl groups can be substituted as disclosed herein.

Compounds of the present teachings can include a "divalent group" defined herein as a linking group capable of forming a covalent bond with two other moieties. For example, compounds of the present teachings can include, but are not limited to, a divalent $C_{1-20}$ alkyl group such as a methylene group.

As used herein, a "leaving group" ("LG") refers to a charged or uncharged atom (or group of atoms) that can be displaced as a stable species as a result of, for example, a substitution or elimination reaction. Examples of leaving groups include, but are not limited to, halide (e.g., Cl, Br, I), tosylate (toluenesulfonyl group, TsO), mesylate (methanesulfonyl group, MsO), brosylate (p-bromobenzenesulfonyl group, BsO), nosylate (4-nitrobenzenesulfonyl group, NsO), water ($H_2O$), ammonia ($NH_3$), and triflate (trifluoromethanesulfonyl group, OTf).

At various places in the present specification, substituents of compounds are disclosed in groups or in ranges. It is specifically intended that the description include each and every individual subcombination of the members of such groups and ranges. For example, the term "$C_{1-6}$ alkyl" is specifically intended to individually disclose $C_1$, $C_2$, $C_3$, $C_4$, $C_5$, $C_6$, $C_1$-$C_6$, $C_1$-$C_5$, $C_1$-$C_4$, $C_1$-$C_3$, $C_1$-$C_2$, $C_2$-$C_6$, $C_2$-$C_5$, $C_2$-$C_4$, $C_2$-$C_3$, $C_3$-$C_6$, $C_3$-$C_5$, $C_3$-$C_4$, $C_4$-$C_6$, $C_4$-$C_5$, and $C_5$-$C_6$ alkyl. By way of other examples, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

Throughout the specification, structures may or may not be presented with chemical names. Where any question arises as to nomenclature, the structure prevails.

In one aspect, the present teachings provide photopolymers that include one or more crosslinkable functionalities. The crosslinking group can form or be a portion of a pendant group covalently attached to the backbone of the polymers. More specifically, the present teachings provide a polymer including a pendant group having the formula:

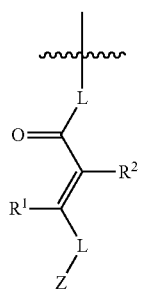

wherein:

L, at each occurrence, is independently —Y—, —Y—O—Y—, -Q-, —Y—S—Y—, —Y—C(O)—O—Y—, -Q-C(O)—O—Y—, —Y—O—C(O)-Q-, —Y—O—C(O)—Y—, -Q-C(O)-Q-, —Y—C(O)—Y—, -Q-C(O)—Y—, or —Y—C(O)-Q-;

wherein:

Q, at each occurrence, is —O—[Y—O]$_p$—Y—O—;

Y, at each occurrence, is a divalent $C_{1-10}$ alkyl group, a divalent $C_{2-10}$ alkenyl group, a divalent $C_{2-10}$ alkynyl group, a divalent $C_{6-10}$ aryl group, or a covalent bond, wherein each of the $C_{1-10}$ alkyl group, the $C_{2-10}$ alkenyl group, the $C_{2-10}$ alkynyl group, and the $C_{6-10}$ aryl group is optionally substituted with 1 to 5 substituents independently selected from a halogen and CN; and p is an integer in the range of 0 to 10;

$R^1$ and $R^2$ are independently H, a halogen, or CN; and

Z is a $C_{1-10}$ alkyl group, a $C_{1-10}$ haloalkyl group, or a $C_{6-10}$ aryl group optionally substituted with 1 to 5 substituents independently selected from a halogen, CN, a $C_{1-20}$ alkyl group, a $C_{1-20}$ haloalkyl group, a $C_{1-20}$ alkoxy group, a —O—$C_{1-20}$ haloalkyl group, a —C(O)—$C_{1-6}$ alkyl group, a —C(O)—$C_{1-6}$ haloalkyl group, and a —C(O)—O—$C_{1-6}$ alkyl group.

In some embodiments, $R^1$ and $R^2$ can be independently H or F. In certain embodiments, Z can be a $C_{1-6}$ alkyl group, a $C_{1-6}$ perfluoroalkyl group, or a phenyl group optionally substituted with 1 to 5 substituents independently selected from a halogen such as F, a $C_{1-20}$ alkyl group, a $C_{1-20}$ haloalkyl group, a $C_{1-20}$ alkoxy group, and a —O—$C_{1-20}$ haloalkyl group. For example, Z can be a phenyl group, a perhalophenyl group, or a phenyl group substituted with a trifluoromethyl group, a $C_{1-20}$ alkoxy group, or a —O—$C_{1-20}$ haloalkyl group. In some embodiments, L, at each occurrence, can be independently —O—, —$C_6H_5$—O—, —C(O)—O—, —C(O)—O—$CH_2CH_2$—O—, —C(O)—O—$CF_2CF_2$—O—, or a covalent bond.

In various embodiments, polymers of the present teachings can have a repeating unit having the formula:

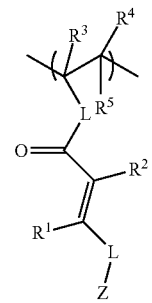

wherein:

$R^3$, $R^4$, and $R^5$ are independently H, a halogen, a $C_{1-10}$ alkyl group, or a $C_{6-14}$ aryl group, wherein each of the $C_{1-10}$ alkyl group and the $C_{6-14}$ aryl group is optionally substituted with 1 to 5 substituents independently selected from a halogen and CN; and $R^1$, $R^2$, L, and Z are as defined herein.

In some embodiments, polymers of the present teachings can have a repeating unit having a formula selected from:

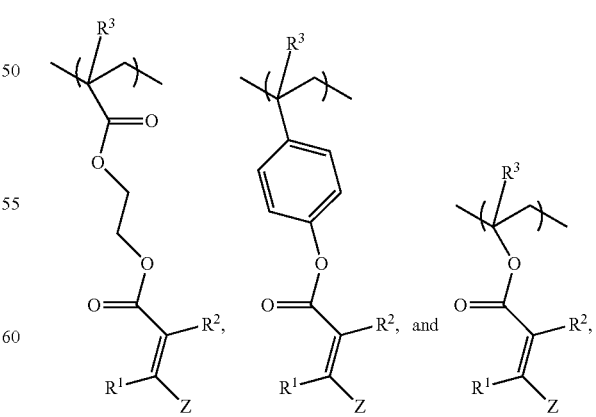

wherein $R^1$, $R^2$, $R^3$, and Z are as defined herein. For example, polymers of the present teachings can have a repeating unit having the formula:

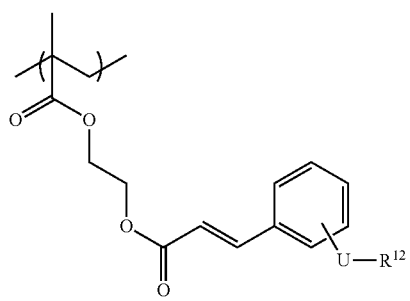
wherein:
U is —Y— or —Y—O—Y—;
$R^{12}$ is H, a $C_{1-20}$ alkyl group, or a $C_{1-20}$ haloalkyl group; and
Y is as defined herein.
In some embodiments, U can be —O— or a covalent bond. In some embodiments, $R^{12}$ can be H, —$CF_3$, a hexyl group, a decyl group, an octadecyl group, or —$(CH_2)_3(CF_2)_7CF_3$. For example, polymers of the present teachings can have a repeating unit selected from:
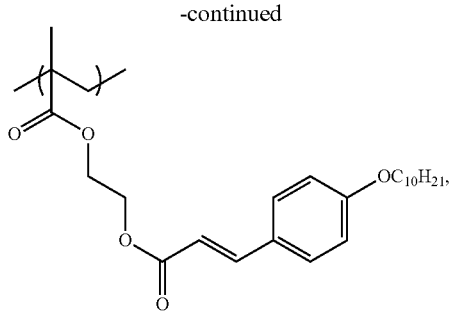
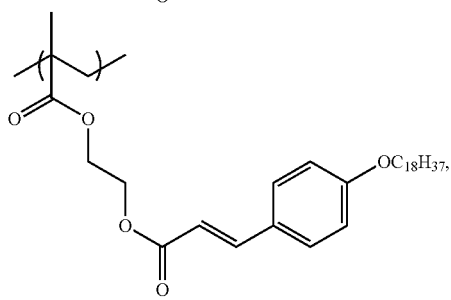
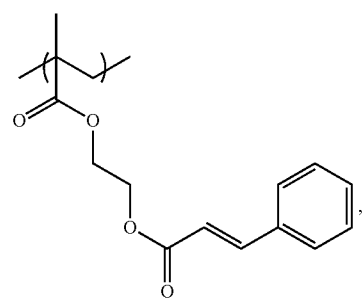
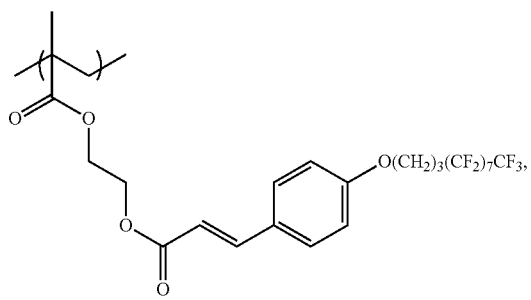
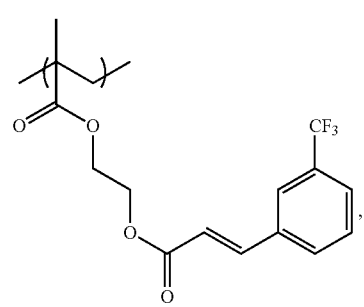
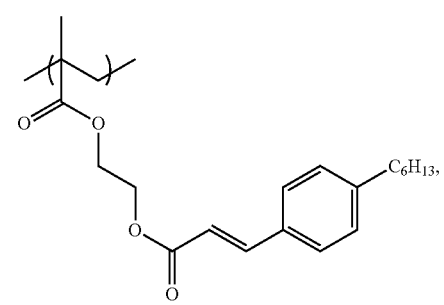
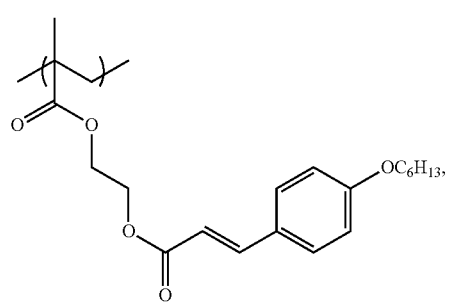
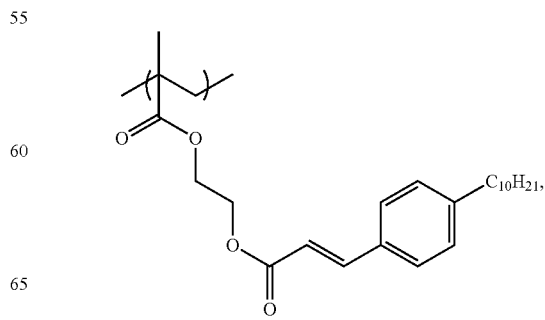

-continued

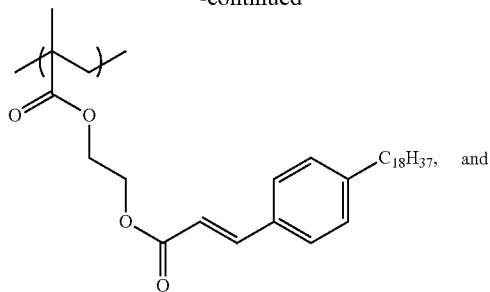

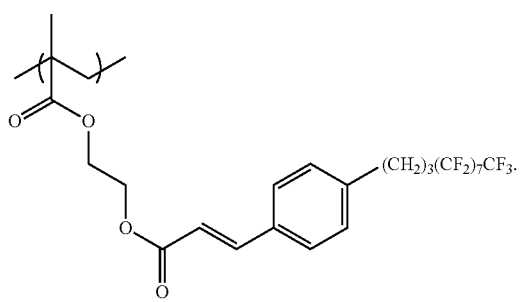

In various embodiments, polymers of the present teachings can have the formula:

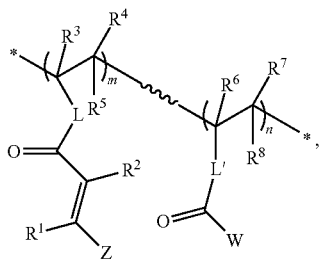

wherein:
$R^6$, $R^7$, and $R^8$ are independently H, a halogen, a $C_{1-10}$ alkyl group, or a $C_{6-14}$ aryl group, wherein each of the $C_{1-10}$ alkyl group and the $C_{6-14}$ aryl group is optionally substituted with 1 to 5 substituents independently selected from a halogen and CN;
L' is —Y—, —Y—O—Y—, -Q-, —Y—S—Y—, —Y—C(O)—O—Y—, -Q-C(O)—O—Y—, —Y—O—C(O)-Q-, —Y—O—C(O)—Y—, -Q-C(O)-Q-, —Y—C(O)—Y—, -Q-C(O)—Y—, or —Y—C(O)-Q-;
W is a $C_{1-10}$ alkyl group, a $C_{1-10}$ haloalkyl group, a $C_{1-10}$ alkoxy group, or a $C_{6-10}$ aryl group optionally substituted with 1 to 5 substituents independently selected from a halogen, CN, a $C_{1-6}$ alkyl group, a $C_{1-6}$ haloalkyl group, a $C_{1-6}$ alkoxy group, a —C(O)—$C_{1-6}$ alkyl group, a —C(O)—$C_{1-6}$ haloalkyl group, and a —C(O)—O—$C_{1-6}$ alkyl group;
m and n are independently a real number, wherein $0<m\leq 1$, $0\leq n<1$, and $m+n=1$; and $R^1, R^2, R^3, R^4, R^5$, L, Q, Y, and Z are as defined herein.

In some embodiments, the polymers can have the formula:

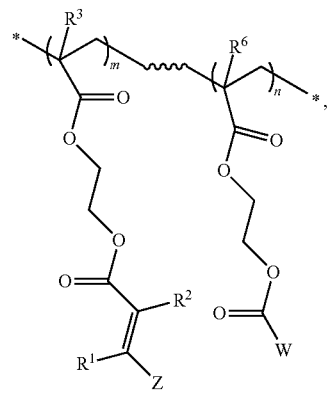

wherein $R^1, R^2, R^3, R^6$, W, Z, m, and n are as defined herein.
For example, the polymers can have a formula selected from:

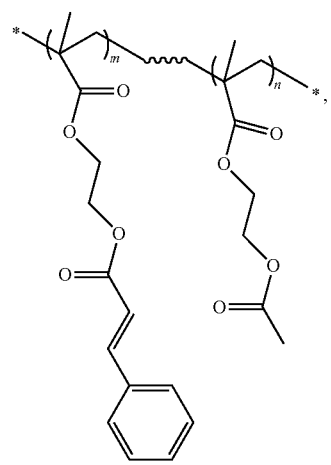

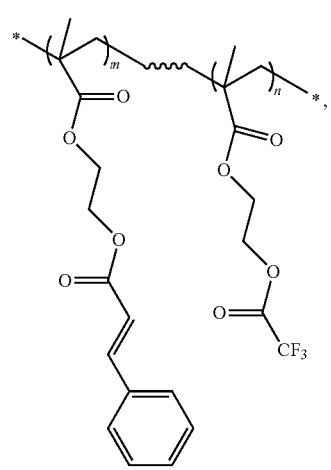

-continued
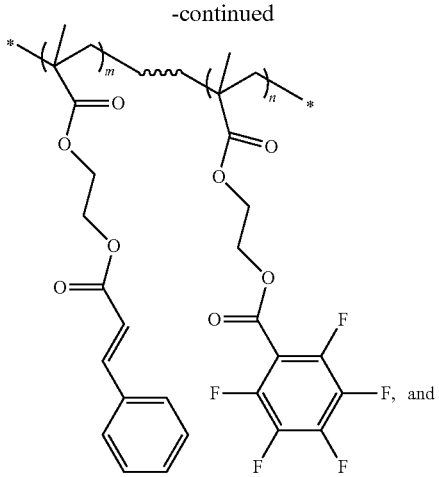
F, and
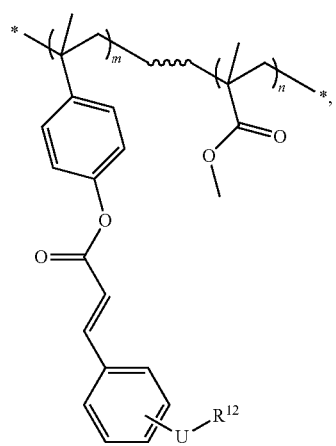
wherein m and n are as defined herein.
In some embodiments, the polymer can have the formula:
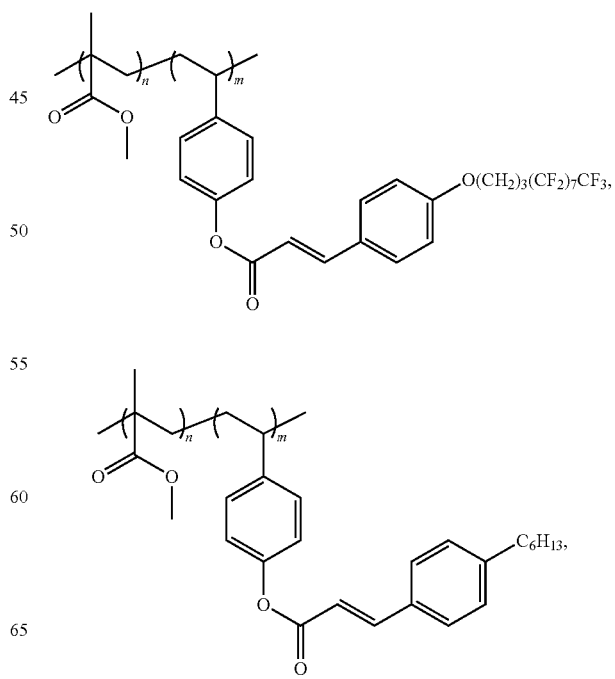
wherein m, n, R$^{12}$, and U are as defined herein.
For example, the polymer can have a formula selected from:
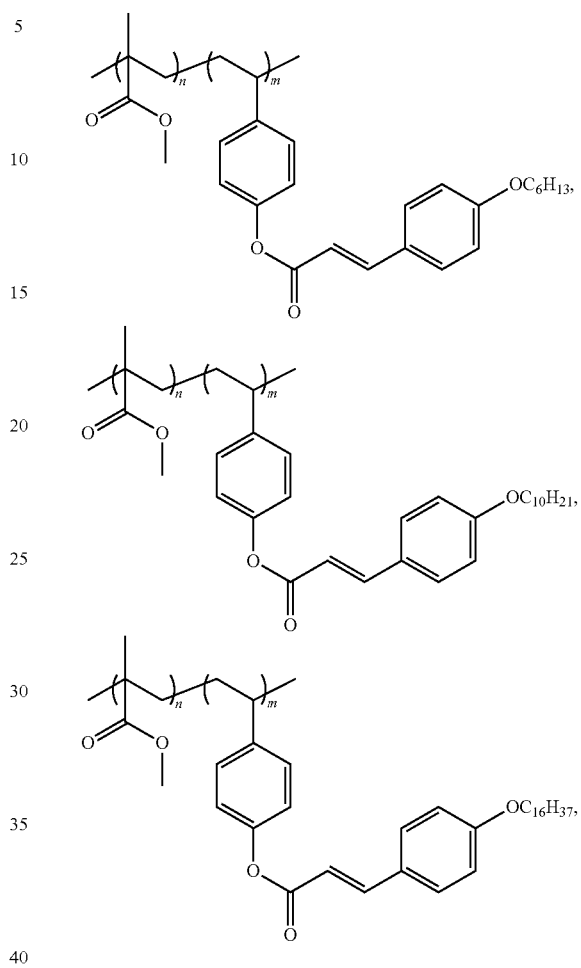

-continued

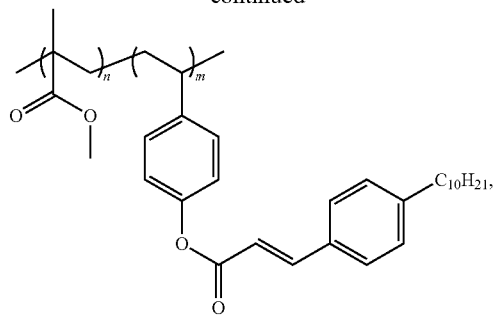

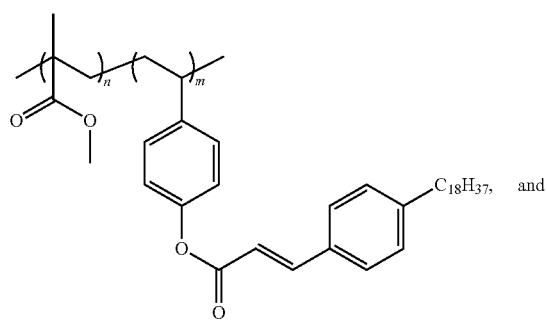

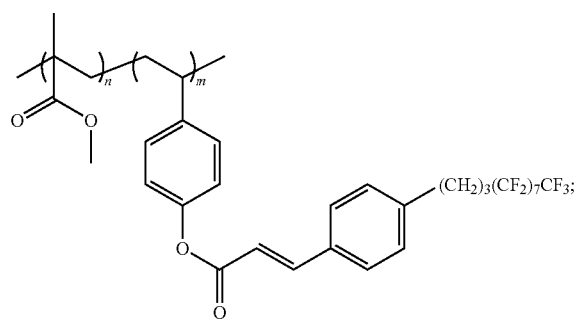

wherein m and n are as defined herein.

In some embodiments, the polymer can have the formula:

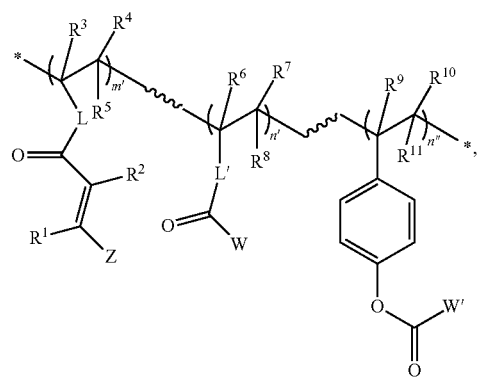

wherein:
$R^9$, $R^{10}$, and $R^{11}$ are independently H, a halogen, a $C_{1-10}$ alkyl group, or a $C_{6-14}$ aryl group, wherein each of the $C_{1-10}$ alkyl group and the $C_{6-14}$ aryl group is optionally substituted with 1 to 5 substituents independently selected from a halogen and CN;

W' is a $C_{1-10}$ alkyl group, a $C_{1-10}$ haloalkyl group, a $C_{1-10}$ alkoxy group, or a $C_{6-10}$ aryl group optionally substituted with 1 to 5 substituents independently selected from a halogen, CN, a $C_{1-6}$ alkyl group, a $C_{1-6}$ haloalkyl group, a $C_{1-6}$ alkoxy group, a —C(O)—$C_{1-6}$ alkyl group, a —C(O)—$C_{1-6}$ haloalkyl group, and a —C(O)—O—$C_{1-6}$ alkyl group;

m', n', and n'' are independently a real number, wherein $0<m'\leq 1$, $0\leq n'<1$, $0\leq n''<1$, and m'+n'+n''=1; and $R^1$, $R^2$, $R^3$, $R^4$, $R^5$, $R^6$, $R^7$, $R^8$, L, L', W, and Z are as defined herein.

In certain embodiments, W' can be a $C_{1-6}$ alkyl group, a $C_{1-6}$ haloalkyl group, or a $C_{6-10}$ aryl group optionally substituted with 1 to 5 substituents independently selected from a halogen, CN, a $C_{1-6}$ alkyl group, a $C_{1-6}$ haloalkyl group, a $C_{1-6}$ alkoxy group, a —C(O)—$C_{1-6}$ alkyl group, a —C(O)—$C_{1-6}$ haloalkyl group, and a —C(O)—O—$C_{1-6}$ alkyl group. For example, W' can be a $C_{1-6}$ alkyl group or a $C_{1-6}$ haloalkyl group. In particular embodiments, W' can be $CF_3$.

Polymers of the present teachings can include, but are not limited to, the polymers below:

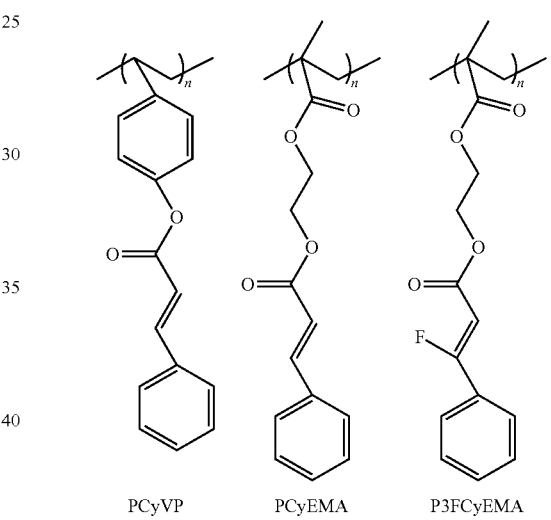

PCyVP     PCyEMA     P3FCyEMA

P2FCyEMA     PF2CyEMA

-continued
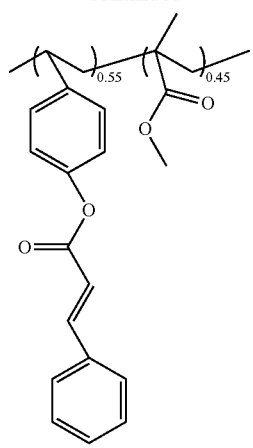
P(CyVP$_{0.55}$-co-MMA$_{0.45}$)
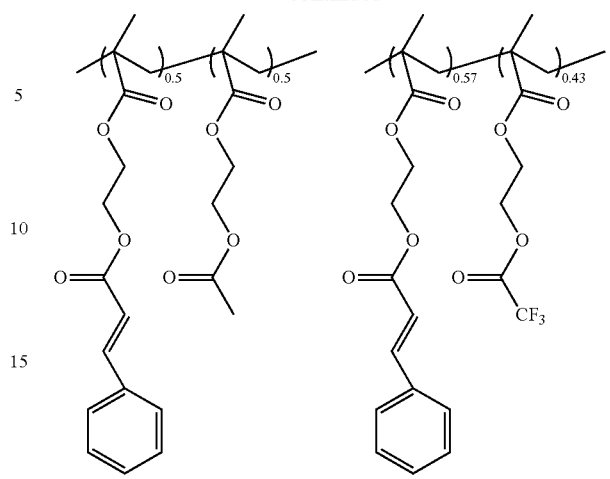
P(CyEMA$_{0.50}$-co-AcEMA$_{0.50}$)     P(CyEMA$_{0.57}$-co-TFAcEMA$_{0.43}$)
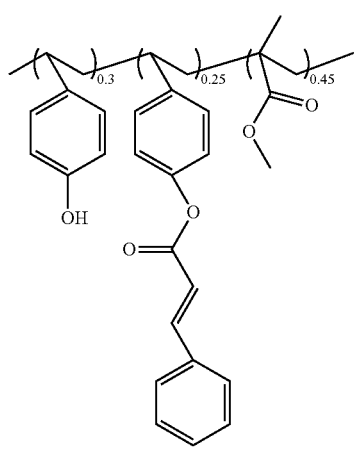
P(VP$_{0.3}$-co-CyVP$_{0.25}$-co-MMA$_{0.45}$)
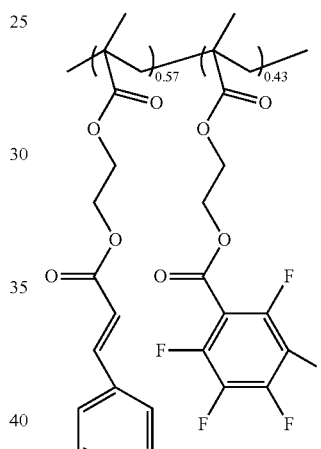
P(CyEMA$_{0.57}$-co-F5BEMA$_{0.43}$)
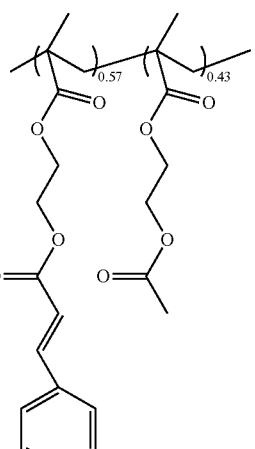
P(CF3CyEMA$_{0.57}$-co-AcEMA$_{0.43}$)
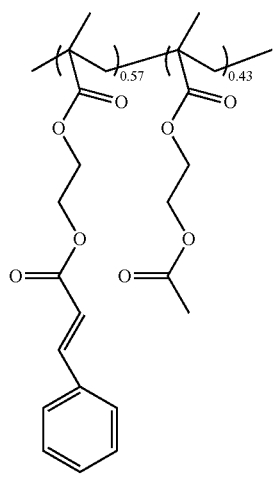
P(CyEMA$_{0.57}$-co-AcEMA$_{0.43}$)
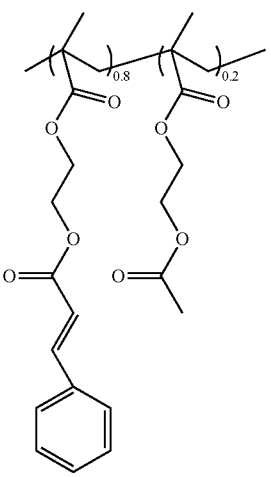
P(CyEMA$_{0.80}$-co-AcEMA$_{0.20}$)
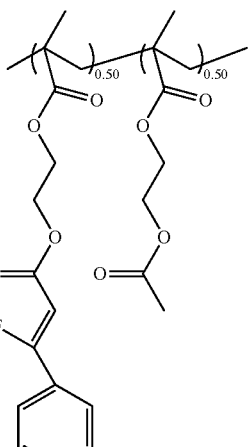
P(3FCyEMA$_{0.50}$-co-AcEMA$_{0.5}$)
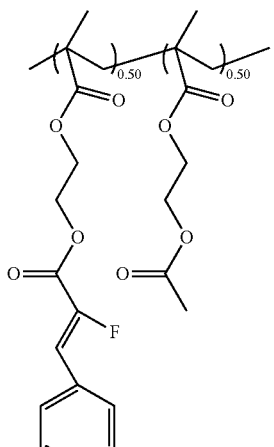
P(2FCyEMA$_{0.50}$-co-AcEMA$_{0.5}$)

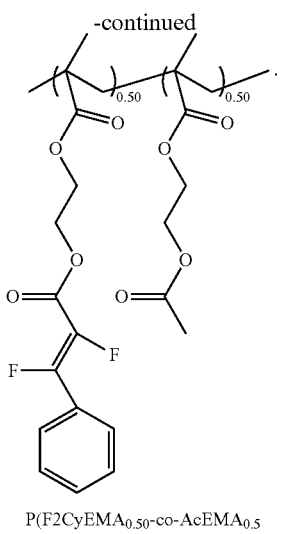

P(F2CyEMA$_{0.50}$-co-AcEMA$_{0.5}$)

Photopolymers of the present teachings can be synthesized following Scheme 1 below. Other synthetic routes, including known to those skilled in the art, also can be used.

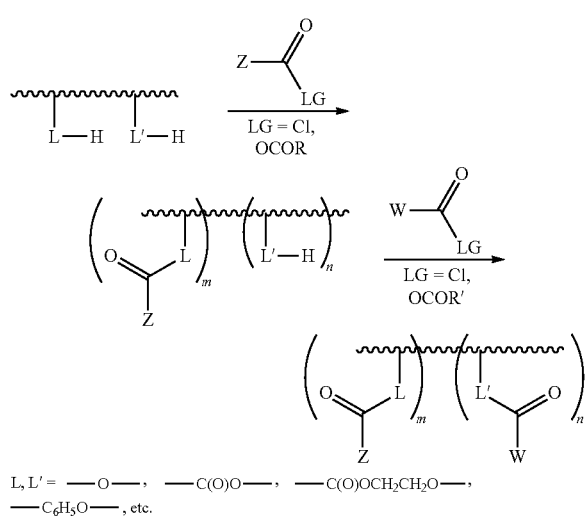

In the scheme above, the desired pendant group can be coupled to a polymer, for example, a hydrophobic polymeric backbone, by reacting nucleophilic groups on the polymer with an acyl chloride, an acyl anhydride, or similar derivatives and groups that can form covalent bonds with nucleophilic groups, for example, electrophilic groups. Without wishing to be bound to any particular theory, it is believed that by derivatizing the OH groups of the polymer to other less acidic groups, polymers of the present teachings can have lower current leakages, as well as improved shelf stability. In some embodiments, The polymers disclosed herein can have satisfactory solubility in common organic solvents. Examples of common organic solvents include, but are not limited to, petroleum ethers; aromatic hydrocarbons such as benzene, chlorobenzene, dichlorobenzene, cyclohexylbenzene, toluene, xylene, and mesitylene; ketones such as acetone, 2-butanone, and cyclohexanone; ethers such as tetrahydrofuran, diethyl ether, bis(2-methoxyethyl)ether, and dioxane; alcohols such as ethanol, propanol, and isopropyl alcohol; aliphatic hydrocarbons, such as hexanes; acetates, such as ethyl acetate; halogenated aliphatic hydrocarbons such as dichloromethane, chloroform, and ethylene chloride; and other aprotic solvents such as dimethyl formamide and n-methyl pyrrolidone. As used herein, a compound can be considered soluble in a solvent when at least 1 mg of the compound can be dissolved in 1 mL of the solvent.

Polymers of the present teachings can be used in various solution-phase processes including, but not limited to, spin-coating, printing, drop casting, dip coating, spraying, and blade coating. Spin-coating involves applying an excess amount of the coating solution onto a substrate, then rotating the substrate at high speed to spread the fluid by centrifugal force. The thickness of the resulting dielectric film prepared by this technique is dependent on the spin-coating rate, the concentration of the solution, as well as the solvent used. Printing can be performed, for example, with a rotogravure printing press, a flexo printing press, or an inkjet printer. The thickness of the dielectric film in these cases will similarly be dependent on the concentration of the solution, the choice of solvent, and the number of printing repetitions. Ambient conditions such as temperature, pressure, and humidity, can also affect the resulting thickness of the film. Depending on the specific printing techniques used, printing quality can be affected by different parameters including, but not limited to, rheological properties of the inks such as solubility and viscosity. For noncontact printing techniques such as inkjet printing, the solubility requirement is generally less stringent and a solubility range as low as about 1-4 mg/mL can suffice. For gravure printing, a higher solubility range may be necessary, often in the range of about 50-100 mg/mL. Other contact printing techniques such as screen-printing and flexo printing, can require even higher solubility ranges, for example, about 100-1000 mg/mL.

One of the advantages of the polymers disclosed herein is their ability to crosslink, for example, photocrosslink, after deposition onto a substrate. The crosslinking functionality allows formation of a densely crosslinked polymeric matrix. The crosslinked polymeric matrix is robust enough to withstand various conditions that are common in device fabrication processes, including patterning and subsequent solution-phase processes, for example, to form/deposit overlying layers (e.g., the semiconductor layer in a top-contact OFET). Without wishing to be bound to any particular theory, the crosslinking chemistry can include a 2+2 photo-stimulated cycloaddition that provides stable cyclobutane moieties. The crosslinking chemistry can also involve free radical additions. Polymers of the present teachings can be cured, for example, photocrosslinked, by exposure to ultraviolet light at, for example, a wavelength of about 245 nm to 350 nm. Crosslinking can also be achieved by other types of radiation, for example, with ion beams of charged particles, and with radioactive sources. Subsequent to the formation of the crosslinked matrix, the dielectric material of the present teachings can be subject to further patterning and process steps, by which additional layers, including additional dielectric, semiconductor and/or conducting layers, can be formed on top of the dielectric material.

Photopolymers of the present teachings can be used to prepare dielectric materials that can exhibit a wide range of desirable properties and characteristics including, but not limited to, low leakage current densities, high breakdown voltages, low hysteresis, large capacitance, uniform film thickness, solution-processability, fabricability at low temperatures and/or atmospheric pressures, air and moisture stability, and/or compatibility with diverse gate materials and/or semiconductors.

Leakage current density is typically defined as a vector whose magnitude is the leakage current per cross-sectional area. As used herein, "leakage current" refers to uncontrolled ("parasitic") current flowing across region(s) of a semiconductor structure or device in which no current should be flowing, for example, current flowing across the gate oxide in a metal-oxide-semiconductor (MOS) structure. As known by those skilled in the art, the leakage current density of a dielectric material can be determined by fabricating a standard metal-insulator-semiconductor (MIS) and/or metal-insulator-metal (MIM) capacitor structures with the dielectric material, then measuring the leakage current, and dividing the measured current by the area of the metal electrodes.

Photopolymers of the present teachings and their crosslinked products can have very low leakage current densities as measured from standard MIS and MIM capacitor structures. For example, photopolymers of the present teachings and their crosslinked products can have a leakage current density of less than or equal to about $4 \times 10^{-8}$ A/cm$^2$ at 2 MV/cm, less than or equal to about $2 \times 10^{-8}$ A/cm$^2$ at 2 MV/cm, less than or equal to about $1 \times 10^{-8}$ A/cm$^2$ at 2 MV/cm, less than or equal to about $8 \times 10^{-9}$ A/cm$^2$ at 2 MV/cm, less than or equal to about $7 \times 10^{-9}$ A/cm$^2$ at 2 MV/cm, less than or equal to about $6 \times 10^{-9}$ A/cm$^2$ at 2 MV/cm, less than or equal to about $4 \times 10^{-9}$ A/cm$^2$ at 2 MV/cm, less than or equal to about $2 \times 10^{-9}$ A/cm$^2$ at 2 MV/cm, or less than or equal to about $1 \times 10^{-9}$ A/cm$^2$ at 2 MV/cm. Photopolymers of the present teachings also exhibit low leakage current densities at higher voltages, for example, a leakage current density of less than or equal to about $1 \times 10^{-6}$ A/cm$^2$ at 4 MV/cm, less than or equal to about $5 \times 10^{-7}$ A/cm$^2$ at 4 MV/cm, less than or equal to about $3 \times 10^{-7}$ A/cm$^2$ at 4 MV/cm, less than or equal to about $1 \times 10^{-7}$ A/cm$^2$ at 4 MV/cm, less than or equal to about $5 \times 10^{-8}$ A/cm$^2$ at 4 MV/cm, or less than or equal to about $1 \times 10^{-8}$ A/cm$^2$ at 4 MV/cm.

Dielectric materials prepared from photopolymers of the present teachings also were found to be able to withstand very high breakdown voltages (i.e., the maximum voltage difference that can be applied across the dielectric before it breaks down and begins to conduct). For example, dielectric materials of the present teachings can withstand a breakdown voltage of 4 MV/cm or higher, a breakdown voltage of 6 MV/cm or higher, or a breakdown voltage of 7 MV/cm or higher.

Polymers of the present teachings also can have relatively low glass transition temperatures. For example, polymers of the present teachings can have a glass transition temperature of less than about 100° C., a glass transition temperatures of less than about 90° C., a glass transition temperatures of less than about 80° C., a glass transition temperatures of less than about 70° C., a glass transition temperatures of less than about 60° C., a glass transition temperatures of less than about 50° C., a glass transition temperatures of less than about 40° C., or a glass transition temperatures of less than about 30° C. In particular embodiments, polymers of the present teachings can have a glass transition temperature in the range of about 30° C. to about 60° C. Glass transition temperature ($T_g$) can be defined as the mid-point of a temperature range at which a material gradually becomes more viscous and changes from a rubbery state to a glassy state. Due to this property, dielectric materials deposited from polymers of the present teachings can allow surface planarization and filling of pinholes before crosslinking, hence improving surface smoothness (for example, achieving a sub-nanometer surface roughness), and accordingly, device performance and operation. Pinholes can also be filled by depositing two or more layers of dielectric materials sequentially on top of one another, hence forming a multilayer dielectric material that can have very good surface uniformity and can be essentially pinhole-free over a large area.

The present teachings further provide articles of manufacture, for example, composites, that includes a dielectric material of the present teachings and a substrate component and/or a semiconductor component. The substrate component can be selected from, but is not limited to, doped silicon, an indium tin oxide (ITO), ITO-coated glass, ITO-coated polyimide or other plastics, aluminum or other metals alone or coated on a polymer or other substrate, a doped polythiophene, and the like. The composite can include a semiconductor component. The semiconductor component can be selected from, but is not limited to, various fused heterocycles, polythiophenes, fused aromatics, and other such organic semiconductor compounds or materials, whether p-type or n-type, otherwise known or found useful in the art. The semiconductor component also can include inorganic semiconductor materials such as silicon, germanium, gallium arsenide, and the like. The composite can include one or more electrical contacts. Such electrical contacts can be made of a metal (e.g., gold) and can function as source, drain, or gate contacts. One or more of the composites described above can be embodied within various organic electronic devices such as OTFTs, specifically, OFETs, as well as capacitors, complementary circuits (e.g., inverter circuits), and the like.

Another aspect of the present teachings relates to methods for preparing a dielectric material. The method can include preparing a solution that includes the polymer described herein, and printing the solution onto a substrate to form a dielectric layer. The method can include exposing the dielectric layer to a radiation source (e.g., ultraviolet light) to induce crosslinking, thereby forming a crosslinked dielectric material. The method can also include printing an additional dielectric layer onto the crosslinked dielectric layer to form a multilayer dielectric material.

Another aspect of the present teachings relates to methods for fabricating organic field effect transistors that include a dielectric material of the present teachings. The dielectric materials of the present teachings can be used to fabricate various types of organic field effect transistors including, but not limited to, top-gate top-contact capacitor structures, top-gate bottom-contact capacitor structures, bottom-gate top-contact capacitor structures, and bottom-gate bottom-contact capacitor structures.

In some embodiments, the method can include preparing a solution that includes the polymer described herein, printing the solution onto a substrate (gate) to form a dielectric layer, exposing the dielectric layer to radiation to induce crosslinking to form a crosslinked dielectric material, forming a semiconductor layer on the crosslinked dielectric material, and forming a first electrical contact and a second electrical contact (source and drain) on the semiconductor layer, to fabricate a top-contact bottom-gate organic field effect transistor.

In other embodiments, the method can include preparing a solution that includes one or more polymers described herein, printing the solution onto a substrate (gate) to form a dielectric layer, exposing the dielectric layer to radiation to induce crosslinking to form a crosslinked dielectric material, forming a first electrical contact and a second electrical contact (source and drain) on the crosslinked dielectric material, and forming a semiconductor layer above the first and second electrical contacts and the dielectric material (i.e., to cover the electrical contacts and an area of the dielectric material between the electrical contacts), to fabricate a bottom-contact bottom-gate organic field effect transistor.

In some embodiments, the method can include forming a first electrical contact and a second electrical contact (source and drain) on a substrate, forming a semiconductor layer above the substrate and the first and second electrical contacts (to cover the electrical contacts and an area of the substrate between the electrical contacts), preparing a solution that includes one or more polymers described herein, printing the solution onto the semiconductor layer to form a dielectric layer, exposing the dielectric layer to radiation to induce crosslinking to form a crosslinked dielectric material, forming a third electrical contact (gate) on the crosslinked dielectric material, wherein the third electrical contact is above an area between the first and second electrical contacts, to fabricate a bottom-contact top-gate organic field effect transistor.

In other embodiments, the method can include forming a semiconductor layer on a substrate, forming a first electrical contact and a second electrical contact (source and drain) on the semiconductor layer, preparing a solution that includes one or more polymers described herein, printing the solution onto the first and second electrical contacts and an area of the semiconductor layer between the first and second electrical contacts to form a dielectric layer, exposing the dielectric layer to radiation to induce crosslinking to form a crosslinked dielectric material, and forming a third electrical contact (gate) on the dielectric material, wherein the third electrical contact is above an area between the first and second electrical contacts, to fabricate a top-contact top-gate organic field effect transistor.

The semiconductor layer and the various electrical contacts can be formed by various deposition processes known to those skilled in the art. For example, the semiconductor layer can be formed by processes such as, but not limited to, physical vapor deposition, different types of printing techniques (e.g., flexo printing, litho printing, gravure printing, ink-jetting, pad printing, and so forth), drop casting, dip coating, doctor blading, roll coating, and spin-coating. Electrical contacts can be formed by processes such as, but not limited to, thermal evaporation and radiofrequency or e-beam sputtering, as well as various deposition processes, including but not limited to those described immediately above (e.g., flexo printing, litho printing, gravure printing, ink-jetting, pad printing, drop casting, dip coating, doctor blading, roll coating, and spin-coating).

In the following examples, polymers and dielectric materials according to the present teachings were prepared and characterized by NMR, IR spectroscopy, elemental analysis, differential scanning calorimetry (DSC), AFM, and metal-insulator-semiconductor (MIS) device leakage and impedance spectroscopy measurements, to demonstrate, among other things, their dielectric properties and their compatibility with various p-type and n-type organic semiconductors. Organic electronic devices, for example, organic thin film transistors (OTFTs), specifically, organic field effect transistors (OFETs), based on these dielectric films also have been fabricated and characterized, data of which are provided below.

The following examples are provided to illustrate further and to facilitate the understanding of the present teachings and are not in any way intended to limit the invention.

Example 1

Preparation of poly(vinylphenylcinnamate) (PCyVP)

Poly(vinylphenol) (2.0 g, $M_w$=20,000 g/mol) was dissolved in 20 mL of anhydrous tetrahydrofuran (THF), to which 5 mL of anhydrous triethylamine (excess) was added. The solution was placed in an ice bath for 10 minutes, followed by addition of a solution of cinnamoyl chloride (5.25 g, excess) in 5 mL of anhydrous THF. After stirring overnight, the reaction mixture was filtered and the polymer precipitates were purified by repetitive precipitation to yield about 2.5 g of poly(vinylphenylcinnamate) (PCyVP) as a white powder.

$^1$H NMR (500 Mz, CDCl$_3$): δ 6.58-7.81 (m, 11H, aromatic and allyl protons), 0.6-1.8 (m, 3H, alkyl protons).

Example 2

Preparation of poly(cinnamoylethylmethacrylate) [P(CyEMA)]

Poly(hydroxyethyl methacrylate) (2.0 g, $M_w$=20,000 g/mol, hydroxyl group: 15.4 mmol) was dissolved in 20 mL of anhydrous pyridine. The solution was placed in an ice bath for 10 minutes, followed by addition of a solution of cinnamoyl chloride (6 g, 36 mmol) in 6 mL of anhydrous THF. The reaction was stirred at room temperature overnight, then precipitated in about 200 mL of cold methanol (MeOH). The polymer precipitates were purified by repetitive precipitation to yield about 2.5 g of poly(cinnamoylethylmethacrylate) [P(CyEMA)] as a white solid.

$^1$H NMR (500 Mz, CDCl$_3$): δ 7.65 (d, 1H, —CH═CH—), 7.51 (s, broad, 2H, aromatic), 7.33 (s, broad, 3H, aromatic), 6.45 (d, 1H, —CH═CH—), 4.09-4.28 (m, 4H, OCH$_2$CH$_2$O), 2.06 (s, sharp, 3H, OCH$_3$), 1.84-0.96 (m, 5H, CCH$_3$, —CH$_2$—).

Example 3

Preparation of Random Copolymer poly(vinylcinnamate-co-methylmethacrylate) [P(CyVP$_{0.55}$-co-MMA$_{0.45}$)]

Poly(vinylphenol-co-methyl methacrylate) (10.0 g, $M_w$=8,000 g/mol, hydroxyl group: 50 mmol, vinylphenol moiety molar ratio 55% based on calculation from proton NMR intergrations) was dissolved in 80 mL of anhydrous THF, to which 9.6 mL of anhydrous triethylamine was added. The solution was placed in an ice bath for 10 minutes, followed by addition of a solution of cinnamoyl chloride (10.95 g, 66 mmol) in 30 mL of anhydrous THF. The reaction was heated to 50° C. and stirred overnight, after which the reaction mixture was precipitated in 700 mL of cold MeOH. The precipitate was filtered, washed with MeOH, re-dissolved in 100 mL of THF, and precipitated again. After further precipitation (three times in total), over 11 g of random copolymer poly (vinylcinnamate-co-methylmethacrylate) [P(CyVP$_{0.55}$-co-MMA$_{0.45}$)] were obtained as a white powder.

$^1$H NMR verified the copolymer ratio of cinnamoyl moiety and methacrylate moieties as 55%:45%. $^1$H NMR (500 Mz, CDCl$_3$): δ 6.63-7.84 (m, 11H, aromatic, —CH═CH—), 0.70-3.63 (m, 13H, alkyl protons). Elemental analysis. found: C, 76.31%, H, 6.31%; calculated: C, 76.27%, H, 6.19%.

Example 4

Comparative Example

Preparation of Random Copolymer poly(vinylphenol-co-vinyl cinnamate-co-methylmethacrylate) [P(VP$_{0.30}$-co-CyVP$_{0.25}$-co-MMA$_{0.45}$)]

Poly(vinylphenol-co-methyl methacrylate) (8.0 g, $M_w$=8,000 g/mol, hydroxyl group: 40 mmol, vinylphenol moiety molar ratio 55% based on calculation from proton NMR intergrations) was dissolved in 60 mL of anhydrous THF, to which 2.6 mL of anhydrous triethylamine was added. The solution was placed in an ice bath for 10 minutes, followed by addition of a solution of cinnamoyl chloride (3 g, 18 mmol) in 20 mL of anhydrous THF. The solution was heated to 50° C. and stirred overnight, after which the reaction mixture was filtered. The clear solution was placed under vacuum to remove triethylamine and the solvent to give 8 g of a random copolymer poly(vinylphenol-co-vinyl cinnamate-co-methyl-methacrylate) [P(VP$_{0.30}$-co-CyVP$_{0.25}$-co-MMA$_{0.45}$)] as a pale yellow polymer.

$^1$H NMR verified the copolymer ratio of phenol, cinnamoyl and methacrylate moieties as 30%, 25%, and 45%. $^1$H NMR (500 Mz, dioxane-d8): δ 6.48-7.82 (m, 11H, aromatic, —CH═CH—), 0.64-2.98 (m, 8H, alkyl protons).

Example 5

Preparation of High Molecular Weight Random Copolymer poly(cinnamoylethyl methacrylate-co-acetoxyethyl methacrylate) [P(CyEMA$_{0.50}$-co-AcEMA$_{0.50}$)]

Poly(hydroxyethyl methacrylate) (2.0 g, M$_w$=1,000,000 g/mol, hydroxyl group: 15.4 mmol) was dissolved in 60 mL of anhydrous pyridine. The solution was placed in an ice bath for 10 minutes, followed by addition of a solution of cinnamoyl chloride (1.28 g, 7.7 mmol) in 4 mL of anhydrous THF. The reaction was stirred at room temperature for 30 minutes, after which 3 mL of acetic anhydride (excess) were added to cap the free OH groups on the polymer. The reaction was stirred at room temperature overnight, then precipitated in about 200 mL of cold MeOH. The polymer precipitates were purified by repetitive precipitation to give about 2 g of a high molecular weight random copolymer poly(cinnamoyl-ethyl methacrylate-co-acetoxyethyl methacrylate) [P(CyEMA$_{0.50}$-co-AcEMA$_{0.50}$)] as a white solid.

$^1$H NMR verified the copolymer ratio as 50%:50%. $^1$H NMR (500 Mz, CDCl$_3$): δ 7.71 (s, broad, 1H, —CH═CH—), 7.57 (s, broad, 2H, aromatic), 7.38 (s, broad, 3H, aromatic), 6.51 (s, broad, 1H, —CH═CH—), 4.12-4.37 (m, 4H, OCH$_2$CH$_2$O), 2.06 (s, sharp, 3H, OCH$_3$), 1.85-0.92 (m, 5H, CCH$_3$, —CH$_2$—).

Example 6

Preparation of Random Copolymer poly(cinnamoyl-ethyl methacrylate-co-acetoxyethylmethacrylate) [P(CyEMA$_{0.57}$-co-AcEMA$_{0.43}$)]

Poly(hydroxyethyl methacrylate) (2.0 g, M$_w$=20,000 g/mol, hydroxyl group: 15.4 mmol) was dissolved in 20 mL of anhydrous pyridine. The solution was placed in an ice bath for 10 minutes, followed by addition of a solution of cinnamoyl chloride (1.46 g, 8.76 mmol) in 4 mL of anhydrous THF. The reaction was stirred at room temperature for 30 minutes, after which 3 mL of acetic anhydride (excess) were added to cap the free OH groups on the polymer. The reaction was stirred at room temperature overnight, then precipitated in about 200 mL of cold MeOH. The polymer precipitates were purified by repetitive precipitation to give about 2 g of a random copolymer poly(cinnamoylethyl methacrylate-co-acetoxyethylmethacrylate) [P(CyEMA$_{0.57}$-co-AcEMA$_{0.43}$)] as a white solid.

$^1$H NMR verified the copolymer ratio as 57%:43%. $^1$H NMR (500 Mz, CDCl$_3$): δ 7.67 (d, broad, 1H, —CH═CH—), 7.54 (s, broad, 2H, aromatic), 7.36 (s, broad, 3H, aromatic), 6.48 (s, broad, 1H, —CH═CH—), 4.16-4.32 (d, 4H, OCH$_2$CH$_2$O), 2.04 (s, sharp, 3H, OCH$_3$), 1.85-0.92 (m, 5H, CCH$_3$, —CH$_2$—).

Example 7

Preparation of Random Copolymer poly(cinnamoyl-ethyl methacrylate-co-acetoxyethylmethacrylate) [P(CyEMA$_{0.80}$-co-AcEMA$_{0.20}$)]

Poly(hydroxyethyl methacrylate) (3.0 g, M$_w$=20,000 g/mol, hydroxyl group: 23 mmol) was dissolved in 30 mL of anhydrous pyridine. The solution was placed in an ice bath for 10 minutes, followed by addition of a solution of cinnamoyl chloride (3.07 g, 18.4 mmol) in 4 mL of anhydrous THF. The reaction was stirred at room temperature for 6 hours, after which 3 mL of acetic anhydride (excess) were added to cap the free OH groups on the polymer. The reaction was stirred at room temperature overnight, then precipitated in about 200 mL of cold MeOH. The polymer precipitates were purified by repetitive precipitation to give about 3 g of a random copolymer poly(cinnamoylethyl methacrylate-co-acetoxyethyl-methacrylate) [P(CyEMA$_{0.80}$-co-AcEMA$_{0.20}$)] as a white solid.

$^1$H NMR verified the copolymer ratio as 80%:20%. $^1$H NMR (500 Mz, CDCl$_3$): δ 7.68 (d, broad, 1H, —CH═CH—), 7.53 (s, broad, 2H, aromatic), 7.35 (s, broad, 3H, aromatic), 6.47 (s, broad, 1H, —CH═CH—), 4.14-4.30 (m, 4H, OCH$_2$CH$_2$O), 2.02 (s, sharp, 3H, OCH$_3$), 1.83-0.93 (m, 5H, CCH$_3$, —CH$_2$—).

Example 8

Preparation of Random Copolymer poly(cinnamoyl-ethyl methacrylate-co-(trifluoroacetoxy)ethyl methacrylate) [P(CyEMA$_{0.57}$-co-TFAcEMA$_{0.43}$)]

Poly(hydroxyethyl methacrylate) (2.0 g, M$_w$=20,000 g/mol, hydroxyl group: 15.4 mmol) was dissolved in 20 mL of anhydrous pyridine. The solution was placed in an ice bath for 10 minutes, followed by addition of a solution of cinnamoyl chloride (1.46 g, 8.76 mmol) in 4 mL of anhydrous THF. The reaction was stirred at room temperature for 3 hours, after which 3 mL of trifluoroacetic anhydride (excess) were added to cap the free OH groups on the polymer. The reaction was stirred at room temperature overnight, then precipitated in about 200 mL of cold MeOH. The polymer precipitates were purified by repetitive precipitation to give about 2 g of a random copolymer poly(cinnamoylethyl methacrylate-co-(trifluoroacetoxy)ethyl methacrylate) [P(CyEMA$_{0.57}$-co-TFAcEMA$_{0.43}$)] as a white solid.

$^1$H NMR verified the copolymer ratio as 57%:43%. $^1$H NMR (500 Mz, CDCl$_3$): δ 7.69 (d, 1H, —CH═CH—), 7.54 (s, broad, 2H, aromatic), 7.36 (s, broad, 3H, aromatic), 6.47 (broad, 1H, —CH═CH—), 3.73-4.33 (m, 4H, OCH$_2$CH$_2$O), 1.93-0.94 (m, 5H, CCH$_3$, —CH$_2$—).

Example 9

Preparation of Random Copolymer poly(cinnamoyl-ethyl methacrylate-co-(pentafluorobenzoyl)ethyl-methacrylate) [P(CyEMA$_{0.57}$-co-F5BEMA$_{0.43}$)]

Poly(hydroxyethyl methacrylate) (2 g, M$_w$=20,000 g/mol, hydroxyl group: 15.4 mmol) was dissolved in 20 mL of anhydrous pyridine. The solution was placed in an ice bath for 10 minutes, followed by addition of a solution of cinnamoyl chloride (1.46 g, 8.76 mmol) in 4 mL of anhydrous THF. The reaction was stirred at room temperature for 3 hours, after which 3 mL of pentafluorobenzoyl chloride (excess) were added to cap the free OH groups on the polymer. The reaction was stirred at room temperature overnight, then precipitated in about 200 mL of cold MeOH. The polymer precipitates were purified by repetitive precipitation to give about 2 g of a random copolymer poly(cinnamoylethyl methacrylate-co-(pentafluorobenzoyl)ethylmethacrylate) [P(CyEMA$_{0.57}$-co-F5BEMA$_{0.43}$)] as a white solid.

$^1$H NMR verified the copolymer ratio as 57%:43%. $^1$H NMR (500 Mz, CDCl$_3$): δ 7.64 (d, 1H, —CH═CH—), 7.52 (s, broad, 2H, aromatic), 7.35 (s, broad, 3H, aromatic), 6.44 (broad, 1H, —CH═CH—), 4.15-4.47 (m, 4H, OCH$_2$CH$_2$O), 0.88-1.83 (m, 5H, CCH$_3$, —CH$_2$—).

Example 10

Preparation of Random Copolymer poly(3-(trifluoromethyl)-cinnamoylethylmethacrylate-co-acetoxyethyl methacrylate) [P(CF3CyEMA$_{0.57}$-co-AcEMA$_{0.43}$)]

Poly(hydroxyethyl methacrylate) (2 g, M$_w$=20,000 g/mol, hydroxyl group: 15.4 mmol) was dissolved in 20 mL of anhydrous pyridine. The solution was placed in an ice bath for 10 minutes, followed by addition of a solution of 3-trifluoromethyl cinnamoyl chloride (2.06 g, 8.76 mmol) in 4 mL of anhydrous THF. The reaction was stirred at room temperature for 3 hours, after which 3 mL of acetic anhydride (excess) were added to cap the free OH groups on the polymer. The reaction was stirred at room temperature overnight, then precipitated in about 200 mL of cold MeOH. The polymer precipitates were purified by repetitive precipitation to give about 2 g of a random copolymer poly(3-(trifluoromethyl)-cinnamoylethylmethacrylate-co-acetoxyethyl methacrylate) [P(CF3CyEMA$_{0.57}$-co-AcEMA$_{0.43}$)] as a white solid.

$^1$H NMR verified the copolymer ratio 57%:43%. $^1$H NMR (500 Mz, CDCl$_3$): $^1$H NMR (500 Mz, CDCl$_3$): δ 7.81-7.29 (m, broad, 4H, aromatic, —CH═CH—), 6.56 (broad, 1H, —CH═CH—), 4.18-4.35 (m, 4H, OCH$_2$CH$_2$O), 2.04 (s, 3H, OCH$_3$) 1.92-0.90 (m, 5H, CCH$_3$, —CH$_2$—).

Example 11

Preparation of Capped poly(cinnamoylethylmethacrylate) [CAP-P(CyEMA)]

P(CyEMA) (3.0 g, Example 2) was dissolved in 30 mL of freshly distilled THF and the resulting solution was cooled into an ice-water bath. Trifluoroacetic anhydride (0.5 g) was added dropwise under vigorous stirring in the absence of light. The reaction was warmed to ambient temperature, stirred for 3 hours, and concentrated to dryness under reduced pressure. The resulted solid was dissolved in 30 mL freshly distilled THF and the resulting solution cooled in an ice-water bath. A second portion of trifluoroacetic anhydride (0.5 g) was added dropwise under vigorous stirring. The reaction was warmed to ambient temperature, stirred overnight, and concentrated under reduced pressure. The residue was dissolved in THF and precipitated by addition of methanol, dissolved again in THF and precipitated by addition of diethylether, and the resulting solid was dried under vacuum to provide CAP-P(CyEMA) as a white foam (yield >95%).

Example 12

Surface Morphology of Spin-Coated Dielectric Films

The photopolymers from Examples 1-3 were dissolved in dioxane to give a solution having a concentration of 80 mg/mL, respectively. The polymer solutions were then spin-coated onto clean silicon substrates between 1300 rpm (acceleration 20). After the spin-coating step, the resulting dielectric films were treated in a 150 W ultraviolet oven for 10 minutes, and then annealed in a vacuum oven at 100° C. for 10 minutes to completely remove any residual solvent. Film thickness and surface smoothness (represented by root mean square (RMS) roughness) were determined by profilometry and atomic force microscopy (AFM), respectively. The results showed that the polymer films of the present teachings are very smooth, with RMS roughness being in the range of about 0.4 nm.

Example 13

Dielectric Properties of Spin-Coated Dielectric Films

Metal-insulator-semiconductor (MIS) capacitor structures were fabricated using the resulting dielectric films from Example 11, and capacitance of the dielectric films was measured. For MIS structure fabrication, heavily doped n-type Si (MEMC Electronic Materials, Antimony/n-doped) was used as the semiconductor onto which the dielectric film was spin-coated to form the insulating layer. Top Au electrodes (area 1=100 μm×100 μm; area 2=200 μm×200 μm; area 3=500 μm×1000 μm; area 4=1000 μm×1000 μm; area 5=1 cm×2 cm) were then vacuum deposited on top of the photopolymer insulator at <1×10$^{-6}$ Torr to complete the MIS capacitor structure. Using a shadow mask, rectangular- or square-shaped Au pads having a feature size ranging from 100 μm×100 μm to 1000 μm×1000 μm, can be deposited to form MIS structures of different sizes. Unless otherwise specified, leakage currents in this and following examples were determined using capacitor structures with Au pads having a feature size of 200 μm×200 μm. The J-E characteristics of capacitors based on the dielectric materials of the present teachings appear to be independent of the area of the Au pads, as shown in FIG. 1.

The current (I)-voltage (V) responses of the MIS structures were measured using a high sensitivity Keithley 6430 Sub-Femtoamp Source Meter with Remote Preampifier, operated by a local Labview program and general purpose interface bus communication. All of the measurements were performed in ambient atmosphere (relative humidity=30-80%). To minimize electrical noise during the I-V scan, a triaxial cabling and probing system (Signatone, Gilroy, Calif.) was employed to probe the MIS structures. The combined use of the Signatone triaxial probing system and the Keithley 6430 source meter reduced the noise level to as low as 10$^{-15}$ A and provided accurate current measurements as low as 10$^{-14}$ A. During the measurement, the bottom electrode was probed with an instrument ground and the top Au pads were probed with a soft tip from the Triaxial probe connected to the Keithley source meter. As controlled by the Labview program, an I-V scan was performed by applying bias to the traixial probe and measuring current through the circuit. The scan rate was between 5-15 s/step, which was controlled by setting the delay time to between 0.5 s and 2 s and the number of measurements per step between 10 and 20.

Figure 2:
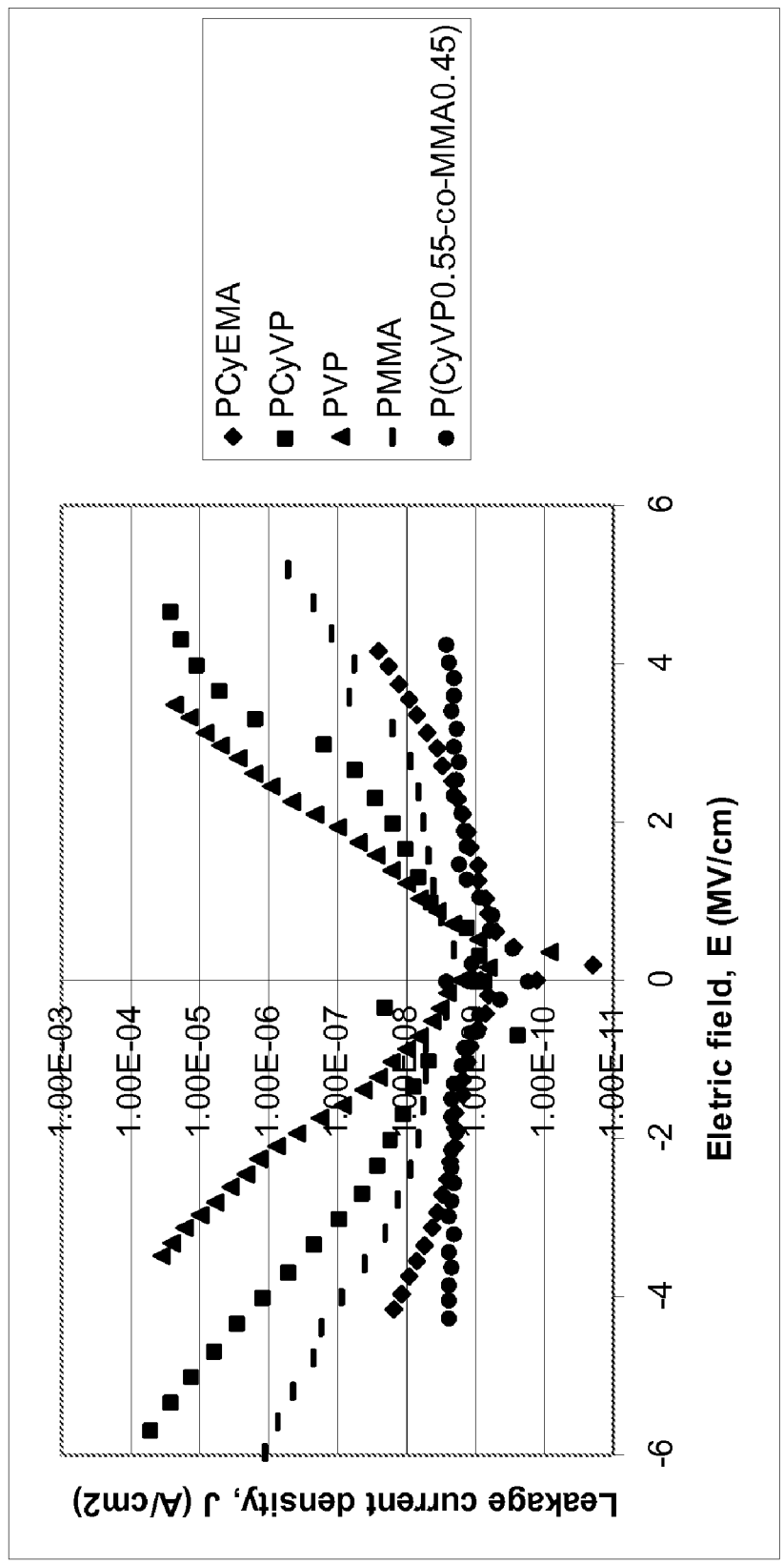
FIG. 2 provides leakage current density (J) versus electric field (E) plots of various metal-insulator-semiconductor capacitor structures that were fabricated using dielectric materials of the present teachings and other comparative dielectric materials.

The leakage current density (J) (I/area of Au pads) versus electric field (E) (V/thickness of dielectric layer) plots are shown in FIG. 2. The J-E responses of dielectric films prepared from PVP, PMMA, and PCyVP are included for comparison.

Figure 3:
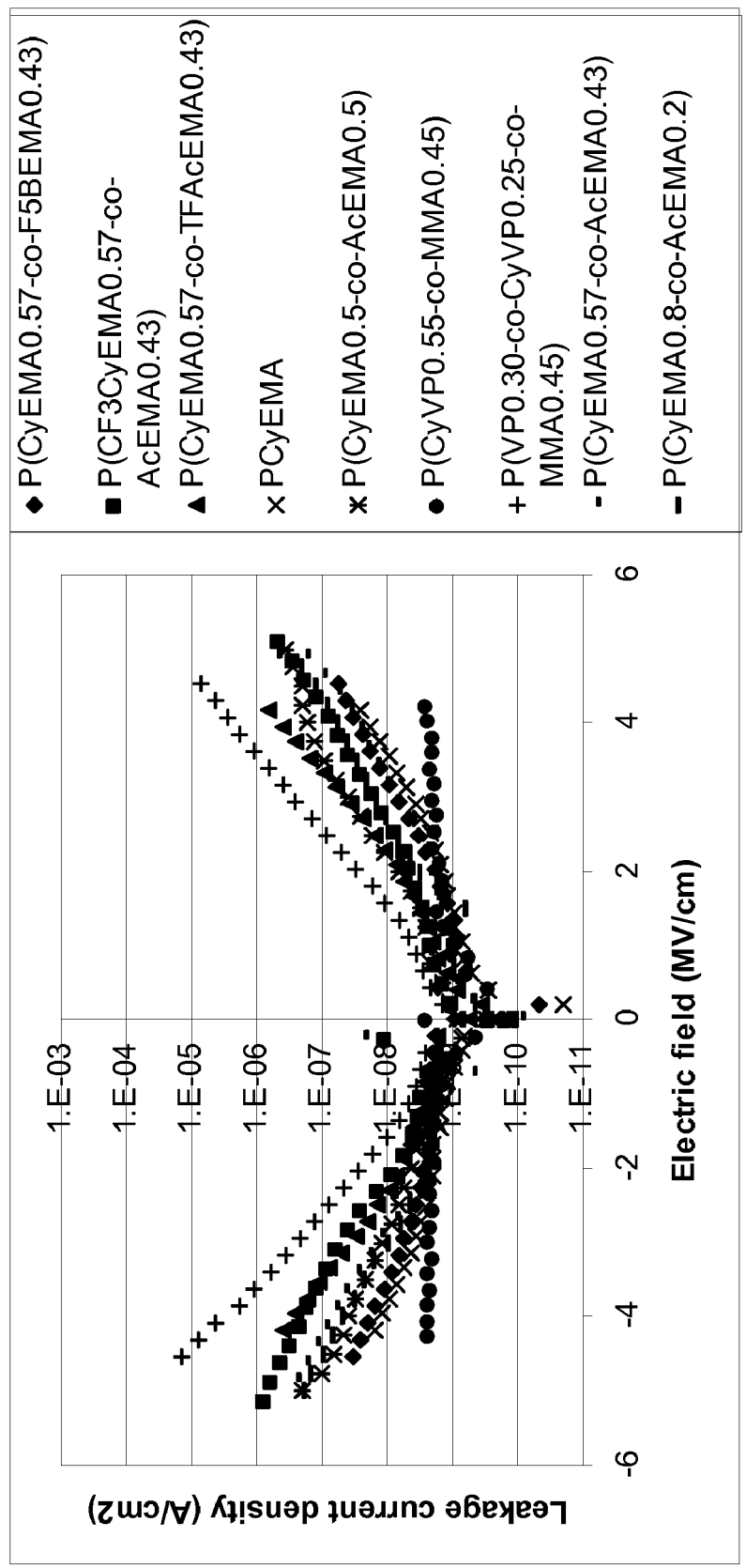
FIG. 3 provides leakage current density (J) versus electric field (E) plots of various metal-insulator-semiconductor capacitor structures that were fabricated using dielectric materials of the present teachings and other comparative dielectric materials.

Similar MIS capacitor structures and test procedures were used to characterize photopolymers from Examples 4 to 10. The leakage current density (J) versus electric field (E) plots are shown in FIG. 3, along with comparison data from polymers of Examples 2 and 3. The dielectric properties, i.e., leakage current density, capacitance ($C_i$), and breakdown voltage (BV), as well as film thickness of the aforementioned examples are summarized in Table 1.

TABLE 1

Dielectric properties of different photopolymer-based dielectric films.

| Photopolymer | Leakage current density (A/cm$^2$) at 2 MV/cm | Leakage current density (A/cm$^2$) at 4 MV/cm | $C_i$ (nF/cm$^2$) | Thickness (nm) | BV (V) |
| --- | --- | --- | --- | --- | --- |
| P(CyVP$_{0.55}$-co-MMA$_{0.45}$) | 2 × 10$^{-9}$ | 1 × 10$^{-8}$ | 6.4 | 470 | >200 |
| CAP-P(CyVP$_{0.55}$-co-MMA$_{0.45}$) | 1 × 10$^{-9}$ | 4 × 10$^{-9}$ | 6.3 | 470 | >200 |
| P(CP$_{0.3}$-co-CyVP$_{0.25}$-co-MMA$_{0.45}$) | 3 × 10$^{-8}$ | 3 × 10$^{-6}$ | 6.8 | 440 | >200 |
| P(CyEMA$_{0.57}$-co-AcEMA$_{0.43}$) | 2 × 10$^{-9}$ | 6 × 10$^{-8}$ | 7.1 | 410 | >200 |
| P(CyEMA$_{0.8}$-co-AcEMA$_{0.2}$) | 2 × 10$^{-9}$ | 4 × 10$^{-8}$ | 7.3 | 400 | >200 |
| P(CyEMA) | 2 × 10$^{-9}$ | 1 × 10$^{-8}$ | 6.0 | 460 | >200 |
| CAP-P(CyEMA) | 1 × 10$^{-9}$ | 4 × 10$^{-9}$ | 6.0 | 460 | >200 |
| P(CyEMA$_{0.57}$-co-F5BEMA$_{0.43}$) | 2 × 10$^{-9}$ | 1 × 10$^{-8}$ | 6.0 | 440 | >200 |
| P(CF3CyEMA$_{0.57}$-co-AcEMA$_{0.43}$) | 7 × 10$^{-9}$ | 2 × 10$^{-7}$ | 6.9 | 430 | >200 |
| P(CyEMA$_{0.57}$-co-TFAcEMA$_{0.43}$) | 6 × 10$^{-9}$ | 3 × 10$^{-7}$ | 6.9 | 480 | >200 |
| P(CyEMA$_{0.5}$-co-AcEMA$_{0.5}$) (High MW) | 4 × 10$^{-9}$ | 4 × 10$^{-8}$ | 7.8 | 400 | >200 |
| PVP | 6 × 10$^{-7}$ | Break down | 6.5 | 570 | 150 V |
| PMMA | 7 × 10$^{-9}$ | 1 × 10$^{-7}$ | 12 | 250 | >200 |
| PCyVP | 2 × 10$^{-8}$ | 1 × 10$^{-6}$ | 9.5 | 300 | >200 |
| Crosslinkable polymer dielectrics reported in the literature | >1 × 10$^{-7}$ | N/A | N/A | N/A | N/A |

TABLE 2

Pentacene field-effect transistor parameters for TFT devices based on polymeric dielectric materials of the present teachings.
(*Carrier mobility was calculated in saturation.)

| Polymer # | Substrate | μ (cm$^2$/Vs) | $I_{on}$:$I_{off}$ | Gate leakage (nA) |
| --- | --- | --- | --- | --- |
| P(CyVP$_{0.55}$-co-MMA$_{0.45}$) | Si | 0.3 | 2 × 10$^6$ | 10 |
| P(CP$_{0.3}$-co-CyVP$_{0.25}$-co-MMA$_{0.45}$) | Si | 0.3 | 2 × 10$^6$ | 100 |
| P(CyEMA$_{0.57}$-co-AcEMA$_{0.43}$) | Si | 0.8 | 1 × 10$^6$ | 100 |
| P(CyEMA$_{0.8}$-co-AcEMA$_{0.2}$) | Si | 0.7 | 3 × 10$^6$ | 40 |
| P(CyEMA) | Si | 1.0 | 2 × 10$^7$ | 3 |
| CAP-P(CyEMA) | Si | 1.2 | 4 × 10$^7$ | 2 |
| P(CyEMA$_{0.57}$-co-F5BEMA$_{0.43}$) | Si | 1.2 | 1 × 10$^7$ | 1000 |
| P(CF3CyEMA$_{0.57}$-co-AcEMA$_{0.43}$) | Si | 0.3 | 5 × 10$^5$ | 10 |
| P(CyEMA$_{0.57}$-co-TFAcEMA$_{0.43}$) | Si | 0.6 | 2 × 10$^6$ | 20 |
| P(CyEMA$_{0.8}$-co-AcEMA$_{0.2}$) | Al | 0.32 | 1 × 10$^6$ | 1 |
| PCyVP | Si | 0.65 | 1 × 10$^5$ | 10000 |
| SiO$_2$ | Si | 0.2 | 1 × 10$^6$ | 10 |

Example 14

Figure 4:
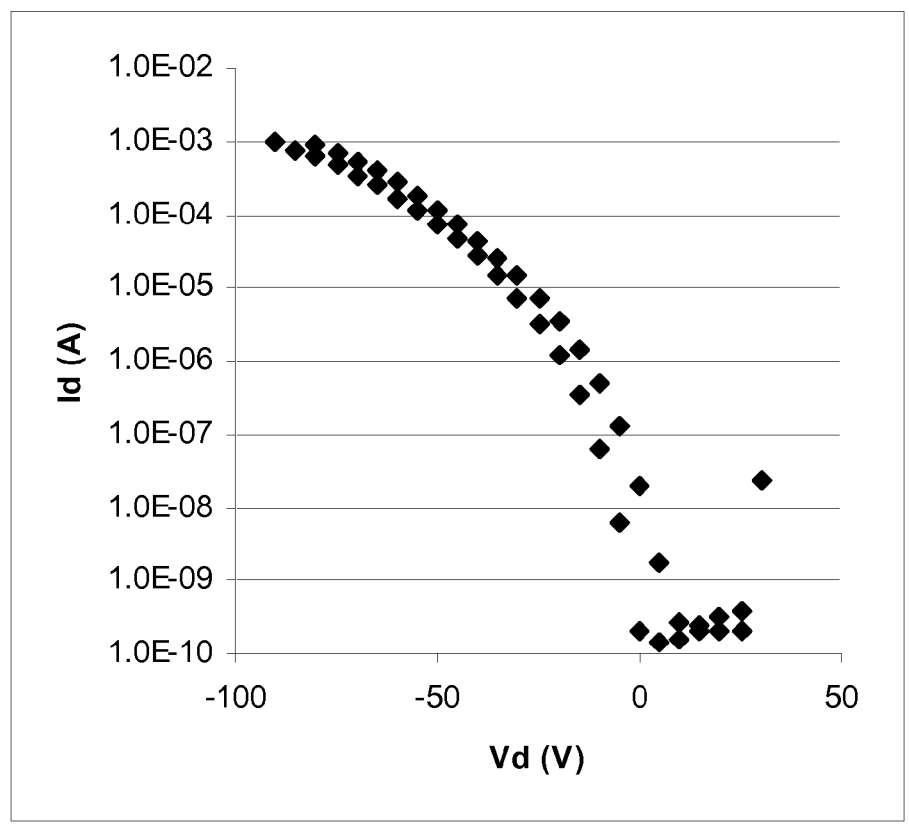
FIG. 4 provides representative transfer and output plots of pentacene-based organic field effect transistors fabricated with spin-coated dielectric materials of the present teachings [P(CyEMA$_{0.57}$-co-F5BEMA$_{0.43}$)].
Figure 4:
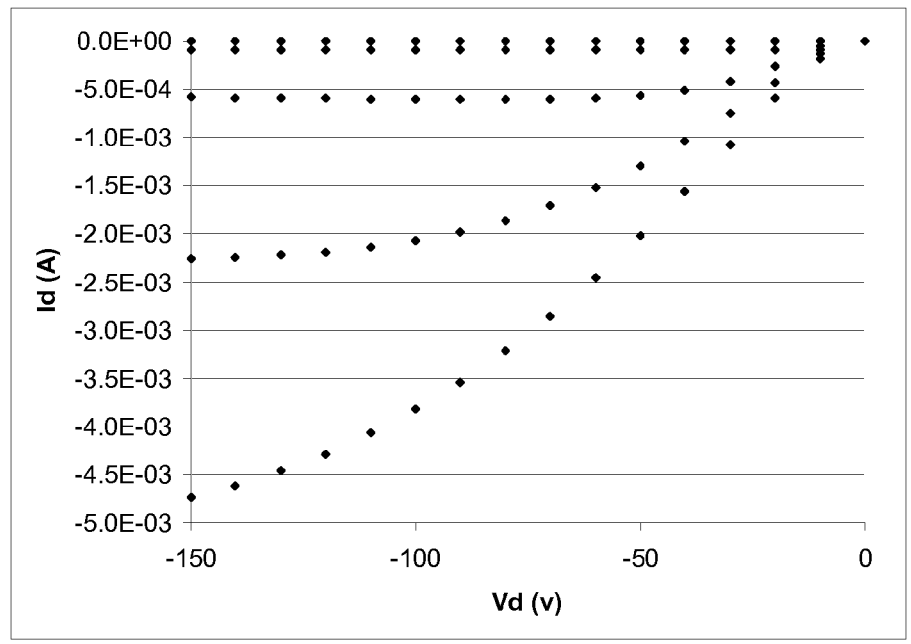

Device Performance of Pentacene-Based OFETs Fabricated with Spin-Coated Dielectric Films Pentacene OFETs were fabricated with dielectric films from Examples 11 and 12 on both silicon and aluminium gate materials. Specifically, the silicon substrates were highly n-doped silicon wafers obtained from Montco Silicon Tech, Inc. (Spring City, Pa.) and cleaned by sonication in organic solvents before use. The aluminium substrates were cut from Al-coated plastic substrates. Pentacene was purchased from Sigma-Aldrich (St. Louis, Mo.) and vacuum-deposited at about 2×10$^{-6}$ Torr (500 Å, 0.3 Å/s) while maintaining the substrate temperature at about 50° C. to about 70° C. Gold (Au) electrodes were vacuum-deposited through shadow masks at 3-4×10$^{-6}$ Torr (500 Å, 0.3 Å/s). The channel length was 50 μm, and the channel width was 5000 μm. These OFETs were found to perform very well, with mobility (μ) approximating 0.5 cm$^2$/Vs, an $I_{on}$:$I_{off}$ ratio up to 2×10$^7$, negligible hysteresis, and extremely low gate leakage currents. Representative OFET transfer and output plots are shown in FIG. 4 (P(CyEMA$_{0.57}$-co-F5BEMA$_{0.43}$) is used as the dielectric layer). OFET performances of these photopolymer-based devices are summarized in Table 2. A comparative pentacene OFET device was fabricated using silicon oxide (SiO$_2$) as the dielectric material. The silicon oxide film has a thickness of 300 nm. The carrier mobilities of this comparative device were found to be about 0.1 cm$^2$/Vs to about 0.3 cm$^2$/Vs.

Example 15

Device Performance of n-type OFETs Fabricated with Spin-Coated Dielectric Films A perylene-type n-type semiconductor, N,N'-bis(n-octyl)-dicyanoperylene-3,4:9,10-bis(dicarboximide) (PDI-8CN$_2$) was used to fabricate n-type OFET devices with photopolymers of the present teachings as the dielectric layer. Specifically, the silicon substrates were highly n-doped silicon wafers obtained from Montco Silicon Tech, Inc. (Spring City, Pa.) and cleaned by sonication in organic solvents before use. PDI-8CN$_2$ was synthesized according to procedures described in U.S. Patent Application Publication No. 2005/

Figure 5:
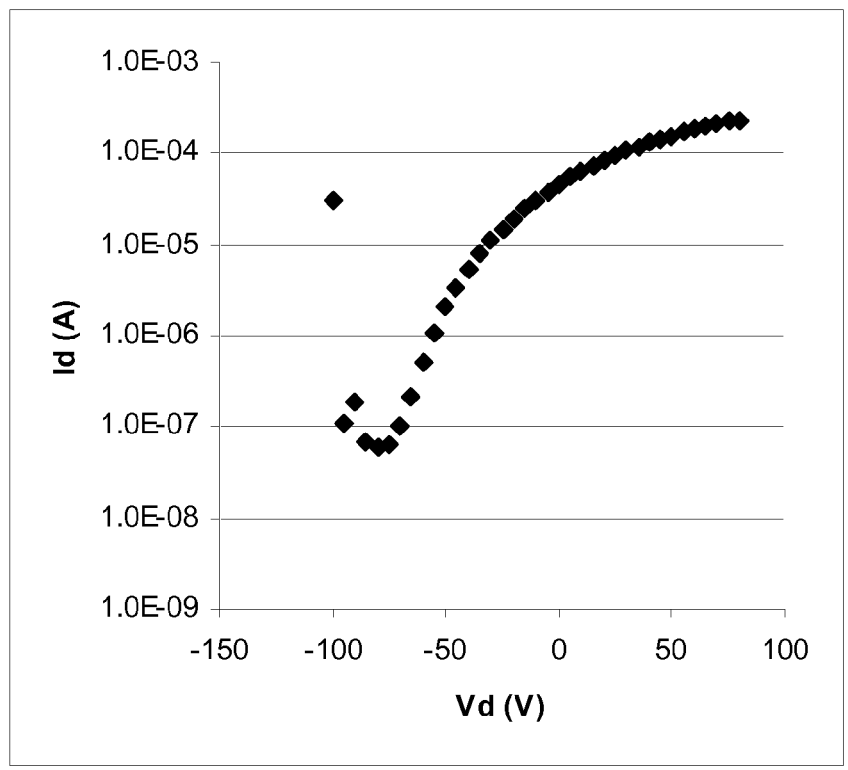
FIG. 5 provides representative transfer and output plots of n-type organic field effect transistors fabricated with spin-coated dielectric materials of the present teachings [P(CyVP$_{0.55}$-co-MMA$_{0.45}$)].
Figure 5:
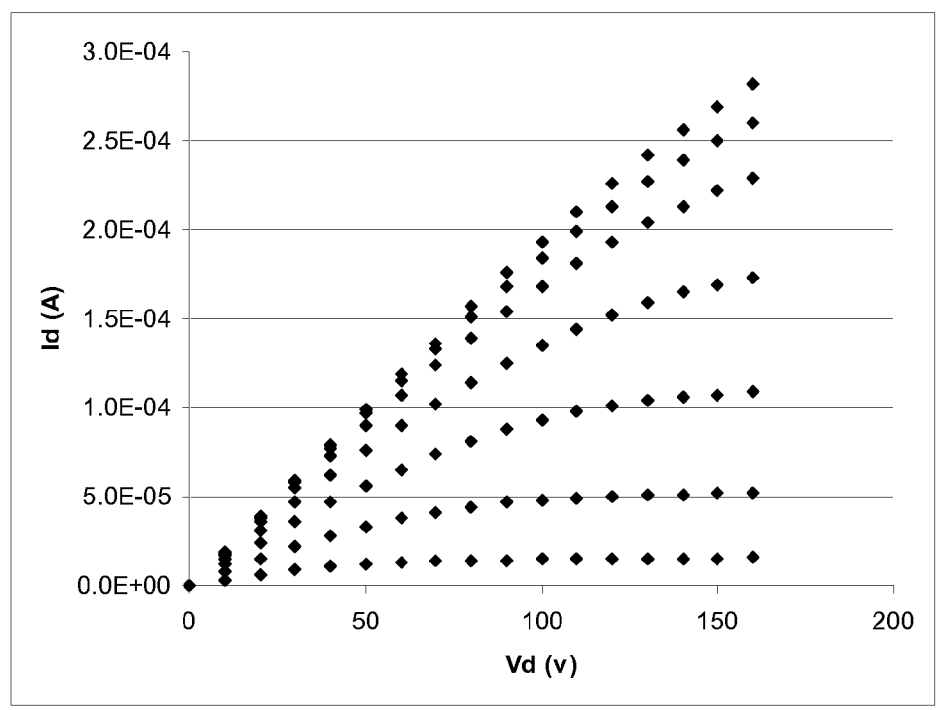

0176970, and vacuum-deposited at about $2\times10^{-6}$ Torr (500 Å, 0.3 Å/s) while maintaining the substrate temperature at about 100° C. to about 110° C. Au electrodes were vacuum-deposited through shadow masks at $3\text{-}4\times10^{-6}$ Torr (500 Å, 0.3 Å/s). The channel length was 50 μm, and the channel width was 5000 μm. These OFETs were found to perform very well, with n-type mobility (μ) approximating 0.05 cm²/Vs, an $I_{on}$:$I_{off}$ ratio up to $1\times10^4$, negligible hysteresis, and minimal gate leakage currents. Representative OFET transfer and output plots are shown in FIG. 5 (P(CyVP$_{0.55}$-co-MMA$_{0.45}$) is used as the dielectric layer).

Example 16

Solubility of Photopolymer Materials Before and After Photocrosslinking

Many photopolymers of the present teachings are soluble in common organic solvents including, but not limited to, tetrahydrofuran, bis(2-methoxyethyl) ether, dioxane, chloroform, ethyl acetate, acetone, toluene, dichlorobenzene, cyclohexylbenzene, dimethylformamide, n-methyl pyrrolidone, and cyclohexanone. Photopolymers from Examples 1-10, for example, have excellent solubility in common organic solvents. For instance, P(CyEMA) from Example 2 can be dissolved in ethyl acetate without heating to give a solution having a concentration of 350 mg/mL. Such a solution is sufficiently viscous for use in gravure printing.

After printing or other solution-phase depositing steps, photopolymers of the present teachings can be cured by exposure to ultraviolet light (e.g., via treatment in a 150 W UV oven for 10 minutes), which renders them insoluble in the organic solvents in which they were initially soluble prior to the photocrosslinking step. The cured dielectric films were found to be robust enough to withstand relatively harsh processes. For example, a photocrosslinked dielectric film was sonicated in dichlorobenzene for 5 minutes, after which its thickness and physical appearance was found to be substantially the same as before the sonication step. This feature of the present dielectric materials makes them attractive candidates for solution-processed bottom-gate OFETs, which requires that the dielectric layer be insoluble in the solution-processing solvent (e.g., dichlorobenzene) for the deposition of the semiconductor layer.

Example 17

Multilayer Dielectric Material Fabricated with Spin-Coated Photopolymer Materials Since photopolymers of the present teachings can become insoluble in common organic solvents after photocrosslinking, multiple layers of dielectric materials can be coated on top of one another without dissolving the earlier deposited layers. Such multilayer dielectric structures can offer many performance advantages including, but not limited to, minimized pinholes and better uniformity over larger areas.

Figure 6:
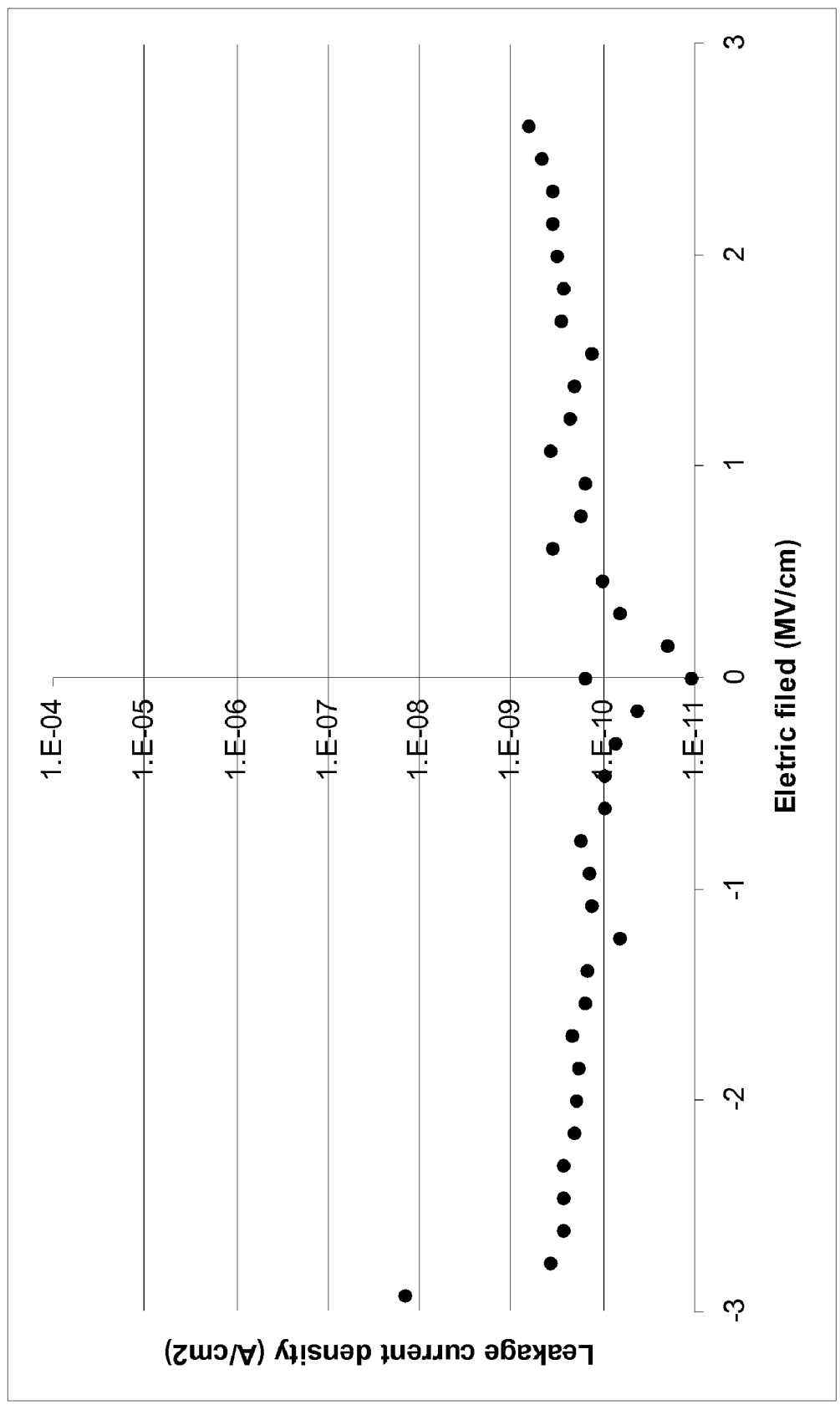
FIG. 6 provides a leakage current density (J) versus electric field (E) plot of a metal-insulator-semiconductor capacitor structure that incorporates a two-layer dielectric material of the present teachings [P(CyVP$_{0.55}$-co-MMA$_{0.45}$)].

MIS capacitor structures and test procedures similar to those described in Example 12 were prepared and used to characterize a two-layer dielectric material prepared from P(CyVP$_{0.55}$-co-MMA$_{0.45}$) (Example 3). The leakage current density (J) versus electric field (E) plot is shown in FIG. 6. While the test pixel shown in FIG. 9 has a relatively large area of about 2 cm² (typical OFET devices and MIS structures have test pixels generally smaller than 0.01 cm²), the leakage current density of the tested two-layer dielectric films is still extremely low, indicating excellent film uniformity over large areas. The thickness of the two-layer dielectric film was about 1000 nm, which is two times thicker than the single-layer films (500 nm) of Example 11, implicating the insolubility of the photocrosslinked film during the multilayer coating process.

Figure 7:
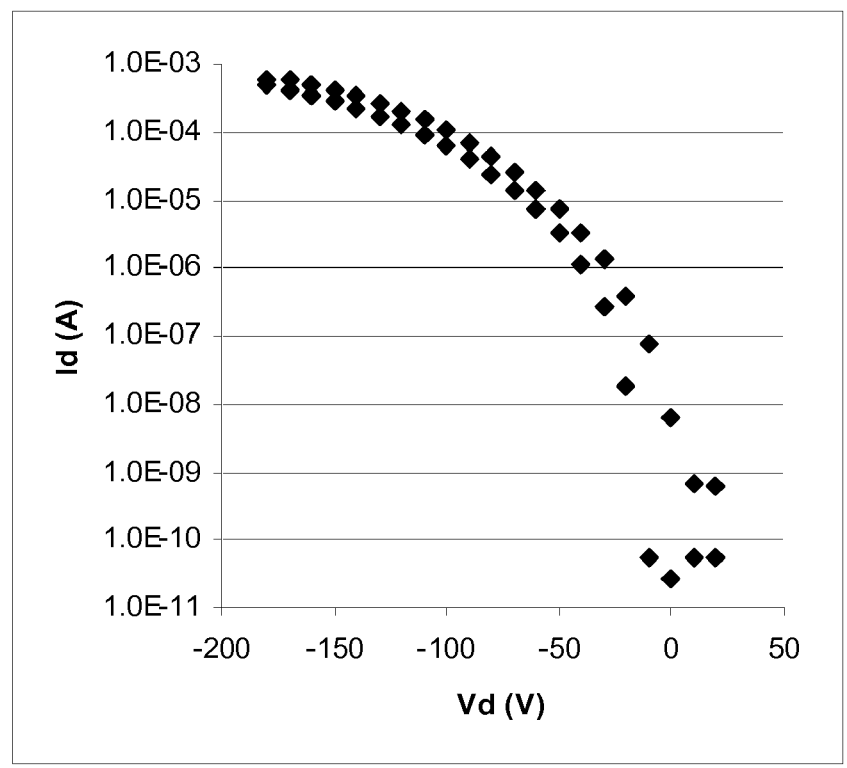
FIG. 7 provides representative transfer and output plots of a pentacene-based organic field effect transistor that incorporates a multilayer dielectric material of the present teachings [P(CyVP$_{0.55}$-co-MMA$_{0.45}$)].
Figure 7:
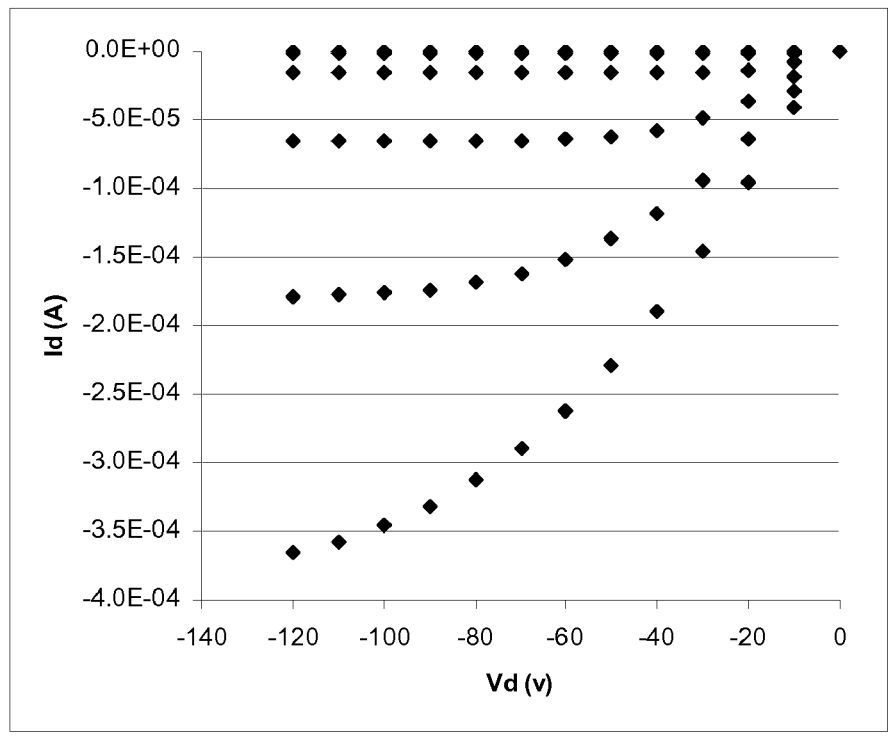

Pentacene OFETs were fabricated with the two-layer dielectric films described above. These pentacene OFETS exhibited excellent device performance, as evidenced by hole mobility (μ) of about 0.22 cm²/Vs, $I_{on}$:$I_{off}$ ratio of about $3\times10^7$, negligible hysteresis, and gate leakage current as low as 3 nA at 180 V gate bias. The transfer and output plots are shown in FIG. 7.

Example 18

Printability of Dielectric Compositions Containing Photopolymers

Figure 8:
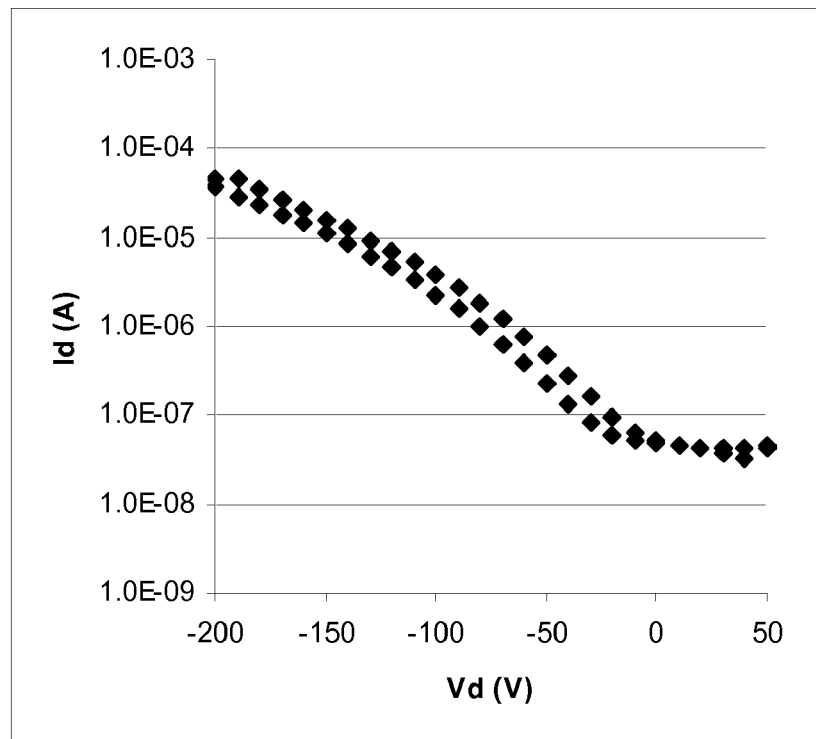
FIG. 8 provides representative transfer and output plots of pentacene-based organic field effect transistors fabricated with printed dielectric materials of the present teachings [P(CyEMA$_{0.80}$-co-AcEMA$_{0.20}$)].
Figure 8:
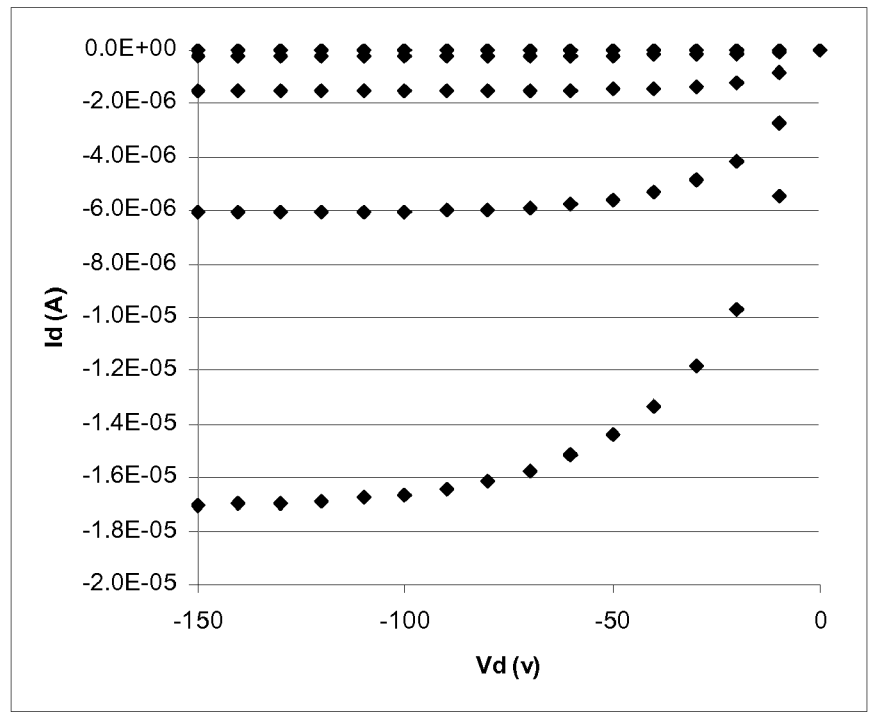

Using the photopolymer P(CyEMA$_{0.80}$-co-AcEMA$_{0.20}$) of Example 7, printable dielectric layers were fabricated. The photopolymer was dissolved in ethyl acetate to give a solution having a concentration of 300 mg/mL solution. Dielectric films were printed using the printing press (IGT), using the gravure mode and the following parameters: Anilox force 100 N, printing speed 0.4 m/s, anilox cylinder 402.100 (40 l/cm, copper engraved-chromium plated, stylus 130°, screen angle 53, volume 23.3 mL/m²). A first layer of the photopolymer was printed on Al-PEN substrate, UV cured for 10 minutes and dried in a vacuum oven for 10 minutes. A second layer of the photopolymer was printed onto the first layer and cured in the same way. MIS capacitor structures and pentacene OFETs were subsequently fabricated. The output and transfer plots of the pentacene OFETs are shown in FIG. 8.

Example 19

UV Curing of the Photopolymers

Figure 9:
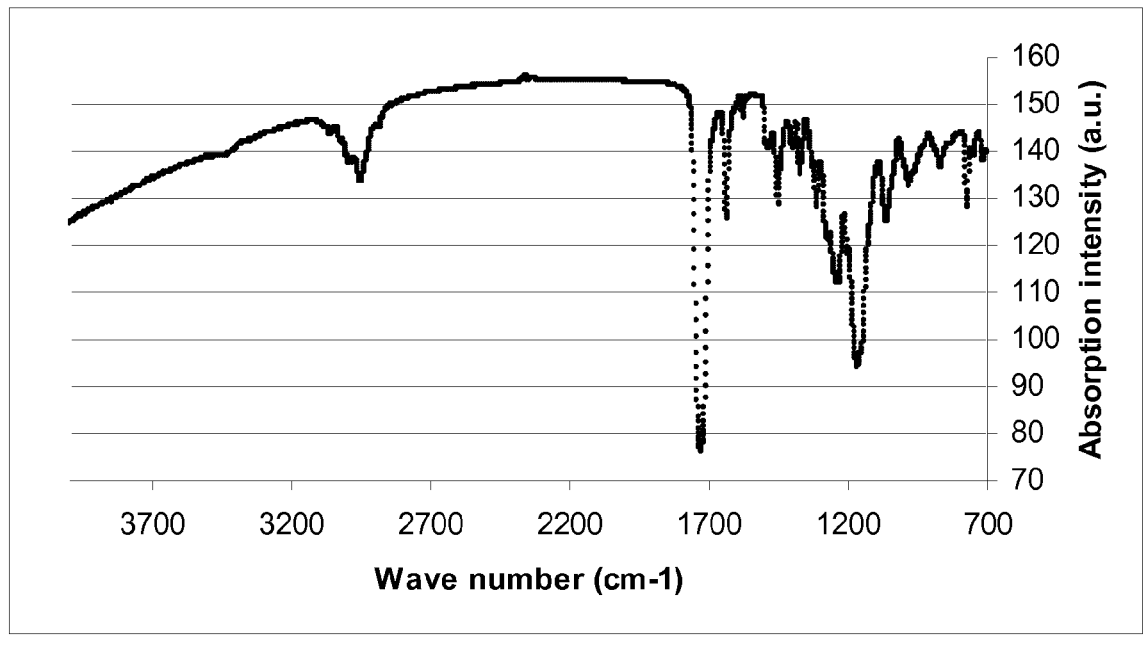
FIG. 9 shows an IR absorption spectrum of a dielectric material of the present teachings before and after crosslinking.
Figure 9:
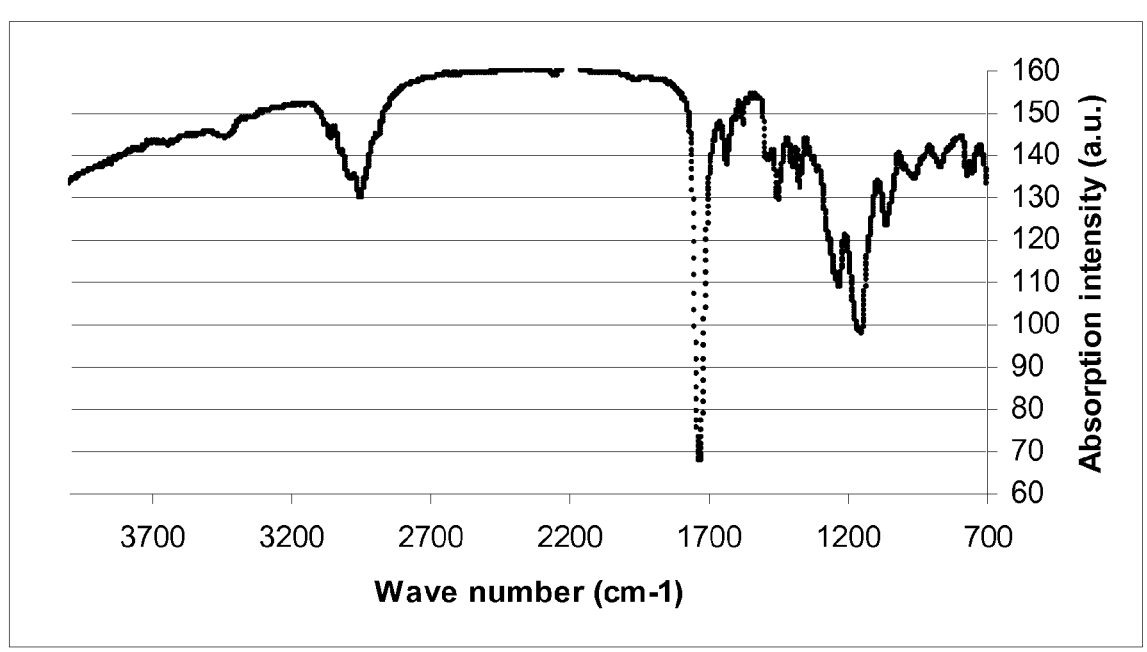

Selected photopolymers of the present teachings were crosslinked by exposure to ultraviolet light at 254 nm. IR spectroscopy was used to confirm the photocrosslinking of these polymers. The double bond in the cinnamoyl group exhibited characteristic IR absorption at 1630 cm$^{-1}$ before photocrosslinking, and disappeared after the 2+2 cycloaddition photocrosslinking reaction as predicted. FIG. 9 shows the IR absorption spectrum for a photopolymer film before and after UV curing. It could be seen that the intensity of the C═O stretching is significantly reduced after the UV treatment.

Example 20

Low Glass Transition Temperature of the Present Photopolymers

Figure 10:
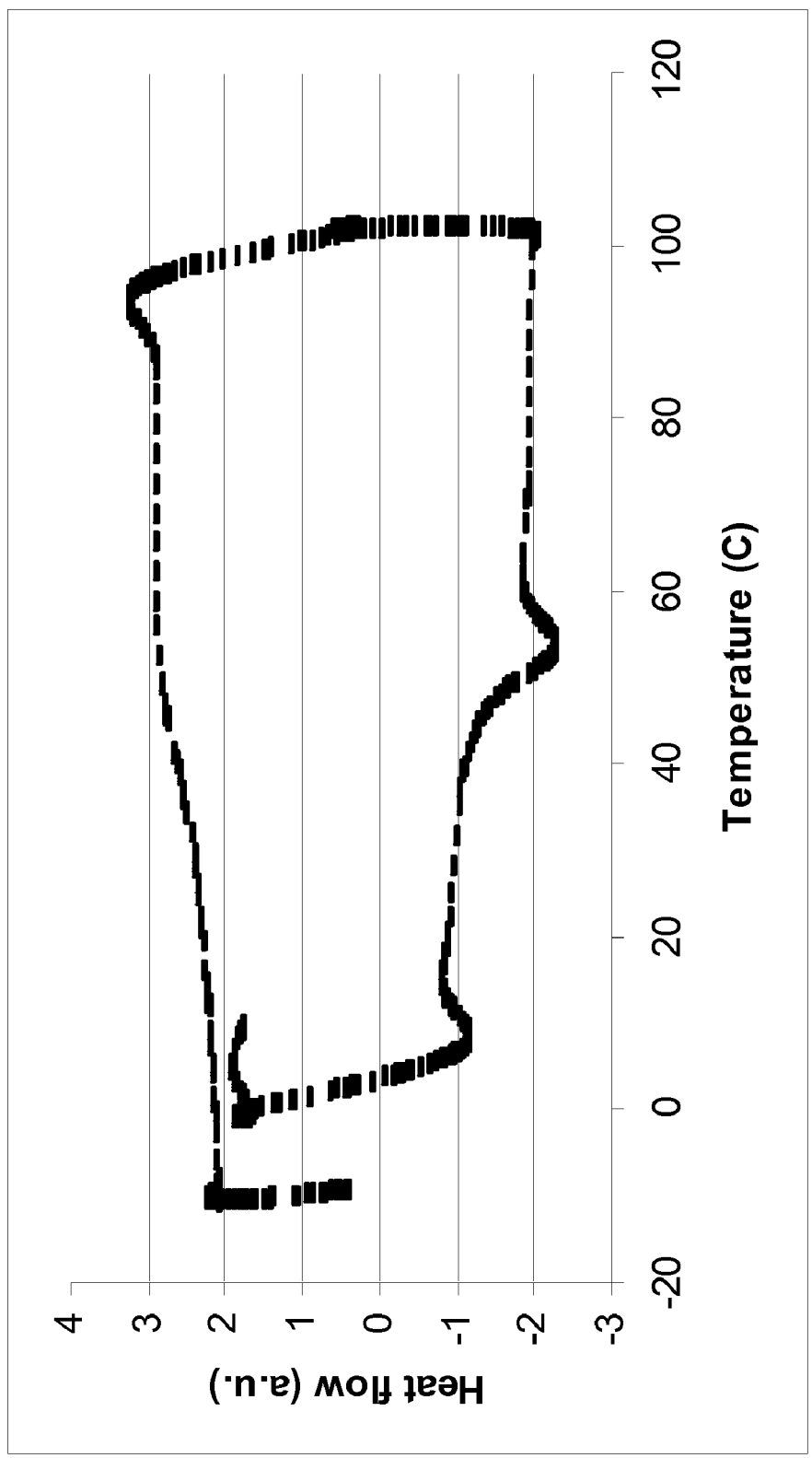
FIG. 10 shows a typical DSC plot of a polymer of the present teachings.

The glass transition properties of the present photopolymers were characterized by differential scanning calorimetry (DSC). FIG. 10 shows a typical DSC plot of photopolymers of the present teachings. Additional data for some of the photopolymers are summarized in Table 3. For example, the glass transition temperature ($T_g$) of P(CyEMA$_{0.57}$-co-AEMA$_{0.43}$) was measured to be about 45° C. (compared to conventional polymeric dielectric material such as PMMA, which has $T_g$ between 80-100° C.). Such low glass transition temperature allows a time period for achieving surface planarization and filling of pinholes before initiating the photocrosslinking step to obtain the final photocured crosslinked dielectric matrix, which can explain the good film forming properties of photopolymers of the present teachings. Polymers with lower glass transition temperatures (e.g. PMMA, which has $T_g$ between about 80-100° C.) typically have better film forming properties compared to polymers with higher glass transition temperatures (e.g., PVP, which has a $T_g$ over 150° C.).

TABLE 3

Glass transition temperatures.

| Polymer | Tg (° C.) |
|---|---|
| Poly(vinyl phenol), PVP | 150 |
| Poly(methylmethacrylate), PMMA | 80-100 |
| Poly(vinylphenylcinnamate), PCyVP (Example 1) | 100 |
| P(CyEMA) (Example 2) | 53 |
| P(CyEMA$_{0.57}$-co-AcEMA$_{0.43}$) (Example 6) | 45 |
| P(CyEMA$_{0.57}$-co-F5BEMA$_{0.43}$) (Example 9) | 56 |
| CAP-P(CyEMA) (Example 11) | 53 |

Example 21

Shelf Stability of Photopolymer Dielectric Films

Figure 11:
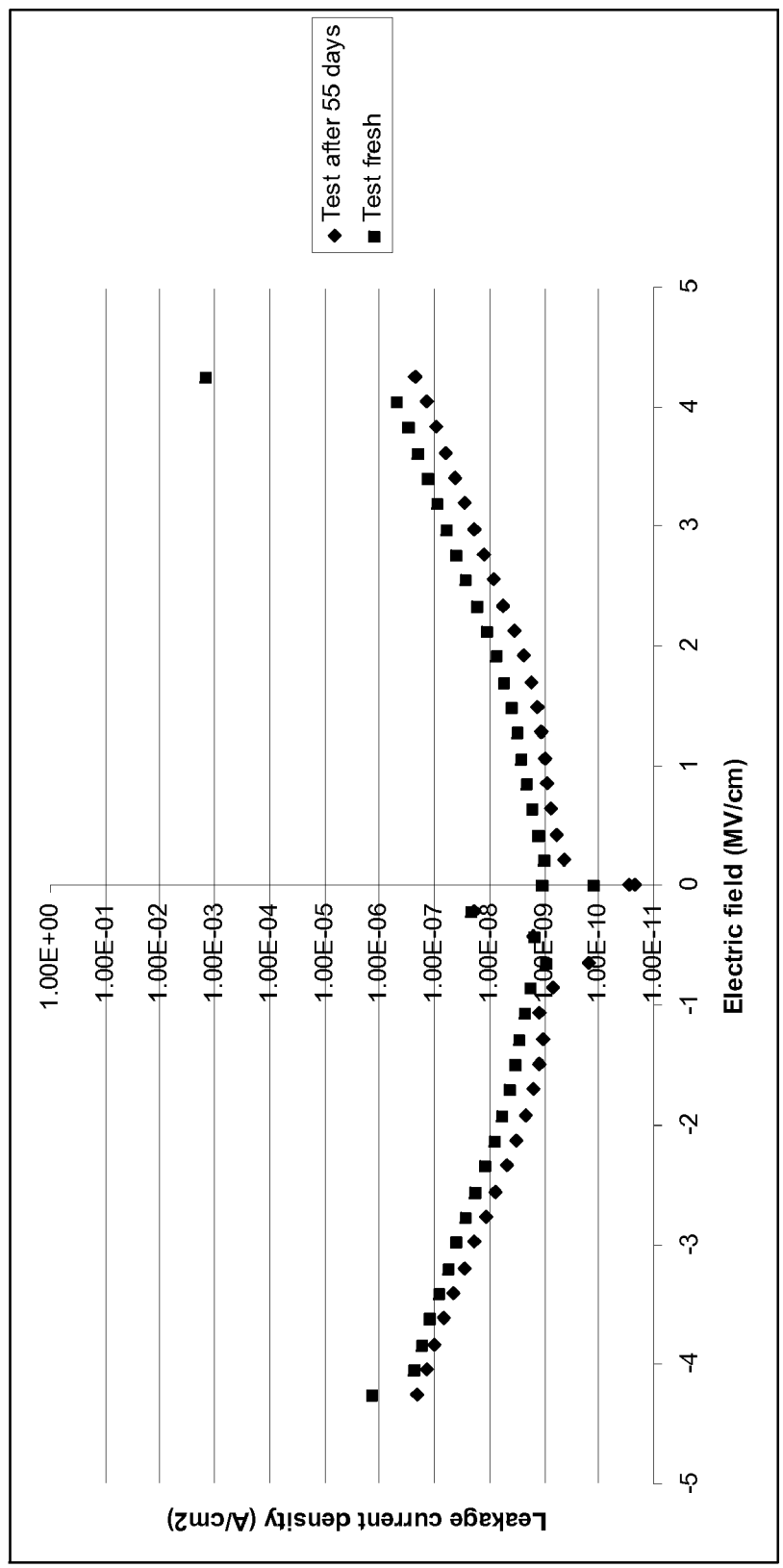
FIG. 11 shows a leakage current density (J) versus electric field (E) plot of a metal-insulator-semiconductor capacitor structure that incorporates a dielectric material of the present teachings having been stored in air for 55 days.

FIG. 11 shows the leakage current density versus electric field (J-E) plot of an MIS capacitor structure incorporating a dielectric film prepared from (P(CyVP$_{0.55}$-co-MMA$_{0.45}$) that had been stored in air for 55 days. It can be seen that, despite the storage period, the photopolymer dielectric film still exhibited excellent dielectric properties, as evidenced by the very low the leakage current density (which actually decreased slightly after 55 days). These results therefore show that the present photopolymer materials possess excellent shelf stability as a dielectric material. As it is recognized, OH group-containing dielectric polymers are typically moisture-sensitive and have limited shelf stability. Without wishing to be bound to any particular theory, it is believed that by derivatizing the photopolymers to decrease the number of OH groups present, photopolymers of the present teachings have improved shelf stability compared to other known polymer dielectric materials such as PVP. Residual OH groups can be capped or masked, for example, by using suitable reagents, including trifluoroacetic anhydride (e.g., Example 11) or trifluoroacetyl chloride.

Example 22

Exclusively Solution-Processed OFET

Completely solution-processed OFETs were fabricated using photopolymers of the present teachings as the dielectric layer and a drop-casted n-type perylene material as the semiconductor layer. It is believed that this was the first n-type OFET device fabricated that had both the semiconductor layer and the dielectric layer deposited from solution.

Figure 12:
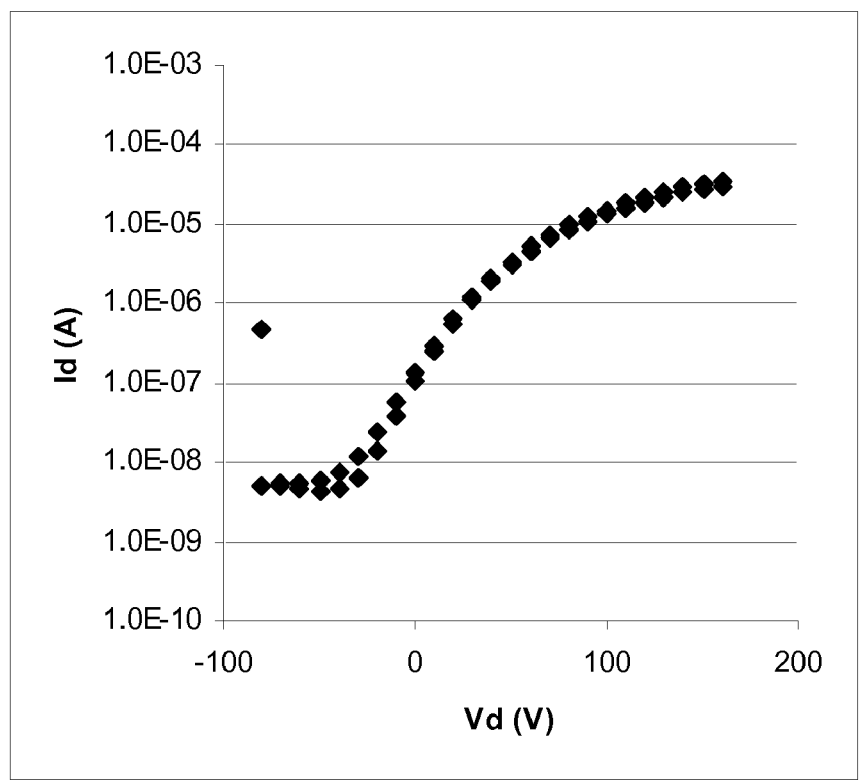
FIG. 12 provides representative transfer and output plots of an organic field effect transistor that incorporates a printed dielectric material of the present teachings and a drop-cast semiconductor layer prepared from N,N'-bis(n-octyl)-dicyanoperylene-3,4:9,10-bis(dicarboximide) (PDI-8CN$_2$).
Figure 12:
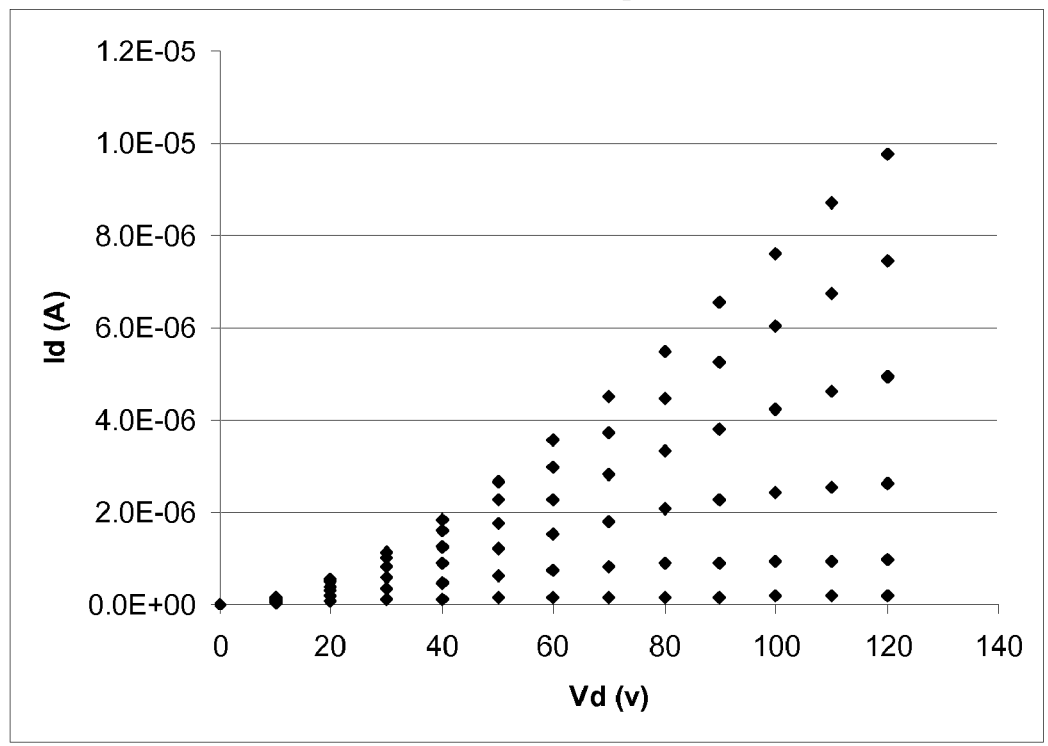

A perylene-based n-type semiconductor, N,N'-bis(n-octyl)-dicyanoperylene-3,4:9,10-bis(dicarboximide) (PDI-8CN$_2$), was dropcasted from a dichlorobenzene solution (2 mg/mL) on a solution-deposited and then crosslinked photopolymer dielectric layer (700 nm) on a Si substrate. The substrate was maintained at 105° C., during which the solvent was evaporated to yield a crystalline semiconductor film. OFET devices were fabricated and tested using procedures similar to those described in the previous examples. Representative transfer and output plots are shown in FIG. 12. The exclusively solution-processed OFETs exhibited good device performance: N-type mobility was calculated to be as high as 0.035 cm$^2$/Vs, $I_{on}$:$I_{off}$ ratio was measured to be about $1\times10^4$, and gate leakage current was measured to be less than or about 50 nA. These results show that the present photopolymer-based dielectric materials have excellent insolubility against the solvents used in the solution processes used to deposit the semiconductor layer, and that the present photopolymer-based dielectric materials have good compatibility with solution-processed n-type semiconductor materials.

Example 23

Photopolymer Dielectric Thin Films

Figure 13:
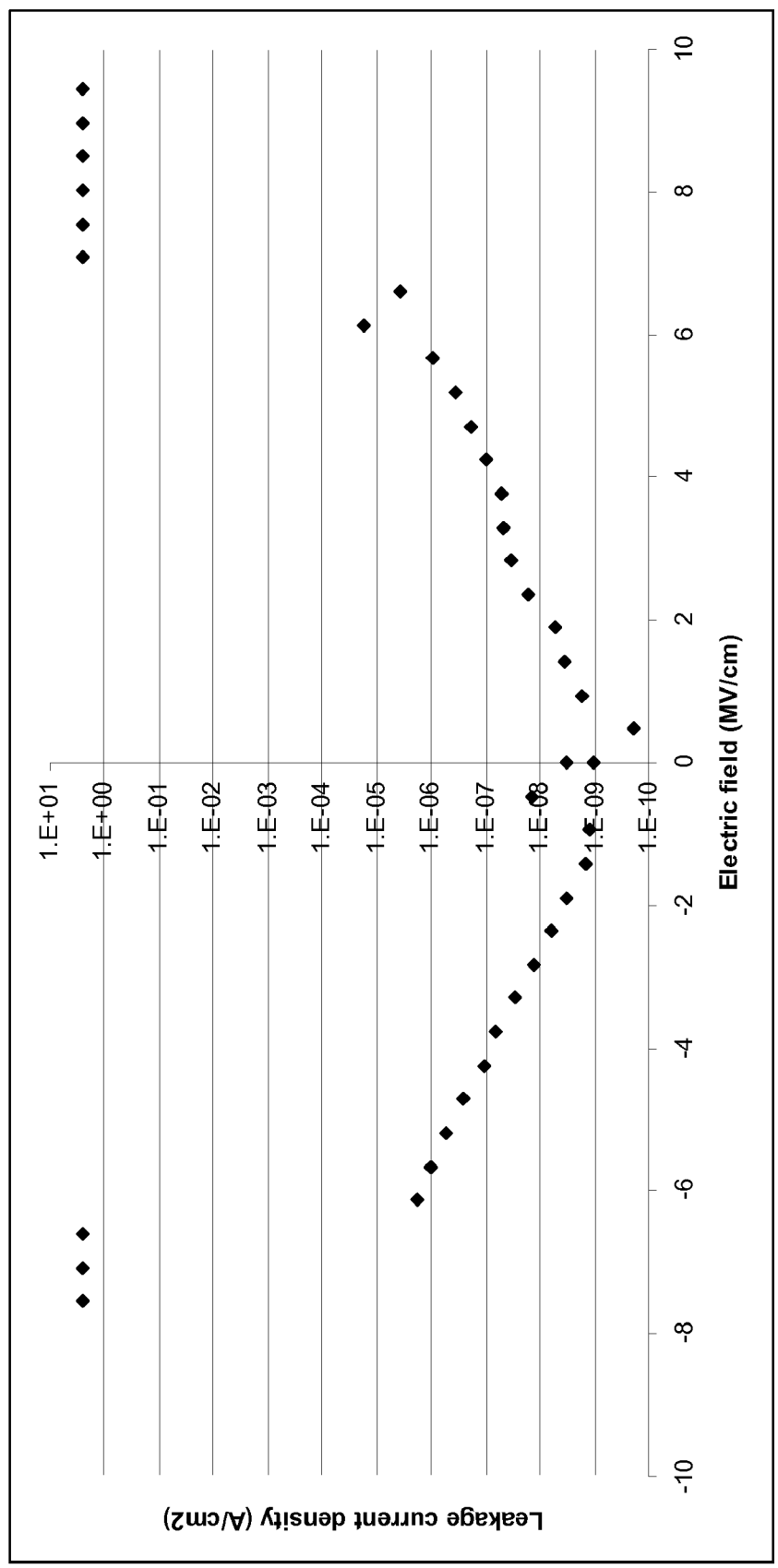
FIG. 13 provides a leakage current density (J) versus electric field (E) plot of a metal-insulator-semiconductor capacitor structure that incorporates a dielectric material of the present teachings having a film thickness of 100 nm.
Figure 14:
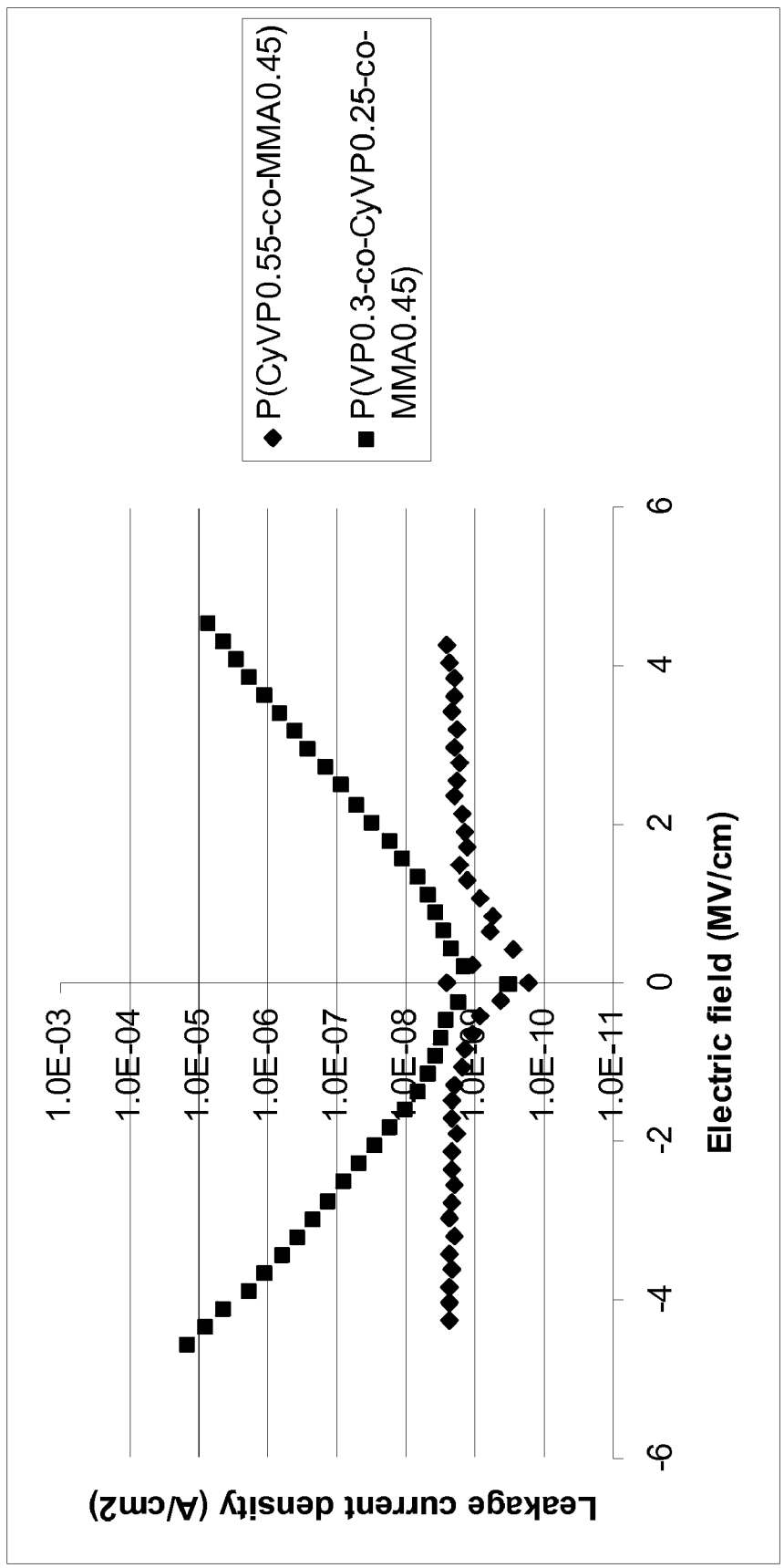
FIG. 14 provides leakage current density (J) versus electric field (E) plots of various metal-insulator-semiconductor capacitor structures that were fabricated using a dielectric material of the present teachings [P(CyVP$_{0.55}$-co-MMA$_{0.45}$)] and a comparative dielectric material [P(VP$_{0.30}$-co-CyVP$_{0.25}$-co-MMA$_{0.45}$)].

FIG. 13 shows the J-E plot of a 100 nm thick photopolymer dielectric film. The data presented in FIG. 14 show comparable leakage current density compared to the 400 nm to 500 nm photopolymer dielectric films demonstrated in the earlier examples. It can be seen that the breakdown field of such a thin film can be as high as 7 MV/cm.

Example 24

Effect of OH Groups in Photopolymer Structures on Leakage Current Density

The leakage current density vs electric field plots of P(CyVP$_{0.55}$-co-MMA$_{0.45}$) (Example 3) and P(VP$_{0.30}$-co-CyVP$_{0.25}$-co-MMA$_{0.45}$) (Example 4) are compared in FIG. 14. It can be seen that the leakage current density of P(CyVP$_{0.55}$-co-MMA$_{0.45}$) is about two orders of magnitude lower that of P(VP$_{0.30}$-co-CyVP$_{0.25}$-co-MMA$_{0.45}$). Since a main difference between the two polymers is that P(VP$_{0.30}$-co-CyVP$_{0.25}$-co-MMA$_{0.45}$) has significant amount of OH groups while P(CyVP$_{0.55}$-co-MMA$_{0.45}$) has almost none, these data suggest that OH groups can have dramatic effect on the leakage current density of dielectric polymers. Additional capping or masking of the residual OH groups (e.g., Example 11) can further reduce leakage current density and stabilize electrical performance under ambient conditions.

Example 25

Effect of Photo-Patterning on Dielectric Properties

Figure 15:
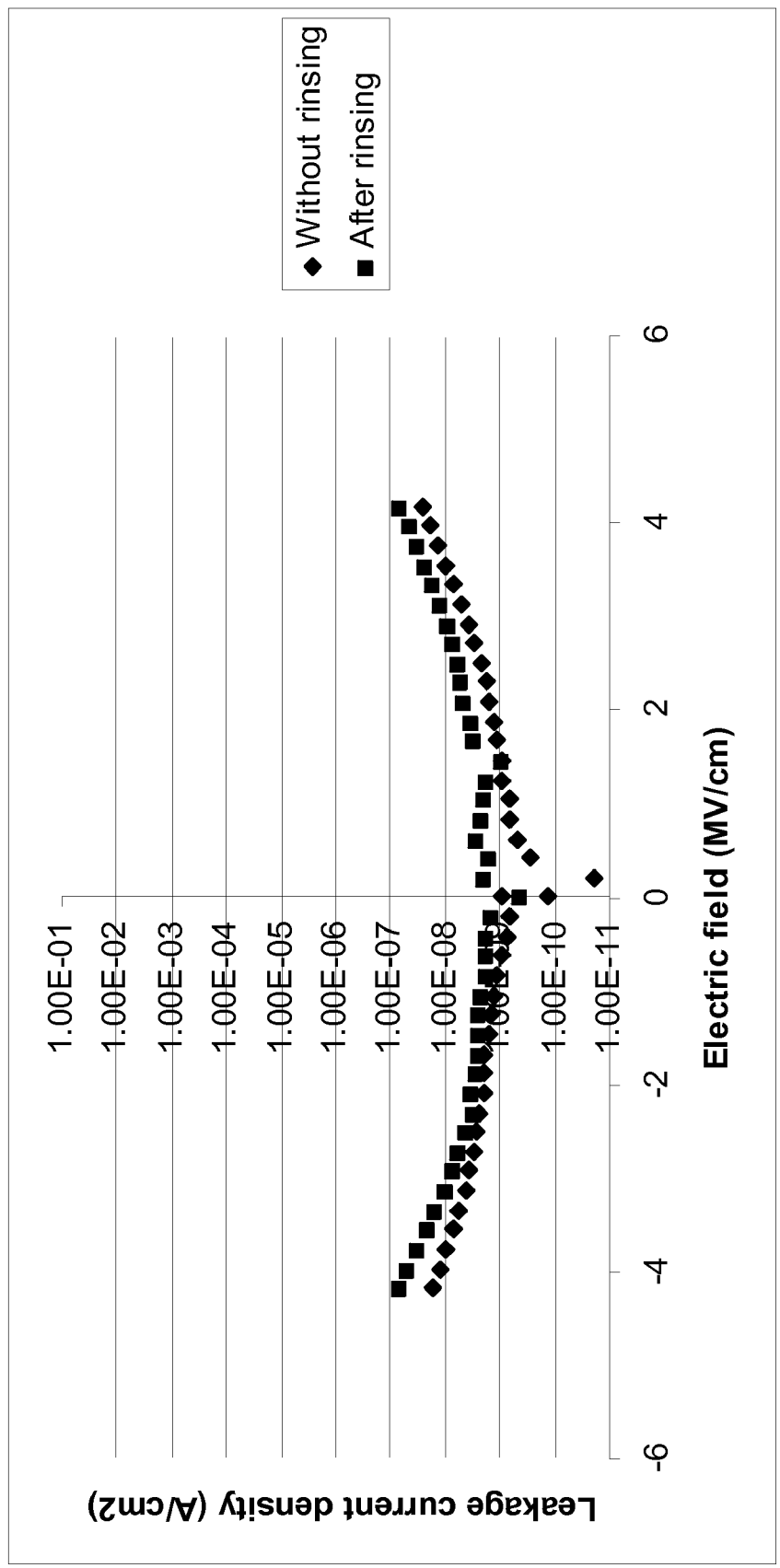
FIG. 15 provides leakage current density (J) versus electric field (E) plots of metal-insulator-semiconductor capacitor structures that were fabricated using spin-coated dielectric materials of the present teachings (photopatterned and rinsed versus no photopatterning/rinsing).

A spincoated photopolymer film [P(CyEMA) in Example 2] was exposed to ultraviolet light (254 nm) through a shadow mask and then washed with THF and dried. The film exhibited a clear pattern negative to that of the shadow mask. Au electrodes were then evaporated on top of the exposed and crosslinked region of the film to fabricate an MIS capacitor structure, the leakage current of which was tested using similar procedures as described earlier. FIG. 15 shows the leakage current density vs electric field plot of such a dielectric film. The J-E response of a similar dielectric film without any photo patterning/solvent rinsing treatment also was shown in the figure for comparison. It can be seen that the leakage current of the patterned dielectric film was comparable to the unpatterned dielectric film.

In another experiment, parallel Au lines were deposited on a Si substrate, after which a photopolymer film [P(CyEMA) in Example 2] was spincoated on top of the Au lines. The photopolymer film was exposed to ultraviolet light (254 nm) through a shadow mask with line-shape openings perpendicular to the underlying Au lines. The photopolymer film was washed with THF and dried. The resulting film has rectangular-shaped "via holes" at the intersections of Au lines and photo mask lines. To test if the "via holes" were free of photopolymer residues, another layer of Au electrode was deposited on top the "via holes" and the interconnect resistance at the "via holes" was estimated to be <5 ohm.

These two experiments show that the photopolymer dielectric materials can be easily integrated with circuitry fabrication processes, including photo patterning and "via hole" patterning processes.

Example 26

Bottom-Contact Bottom-Gate OFETs with a Photopolymer Dielectric Layer

Figure 16:
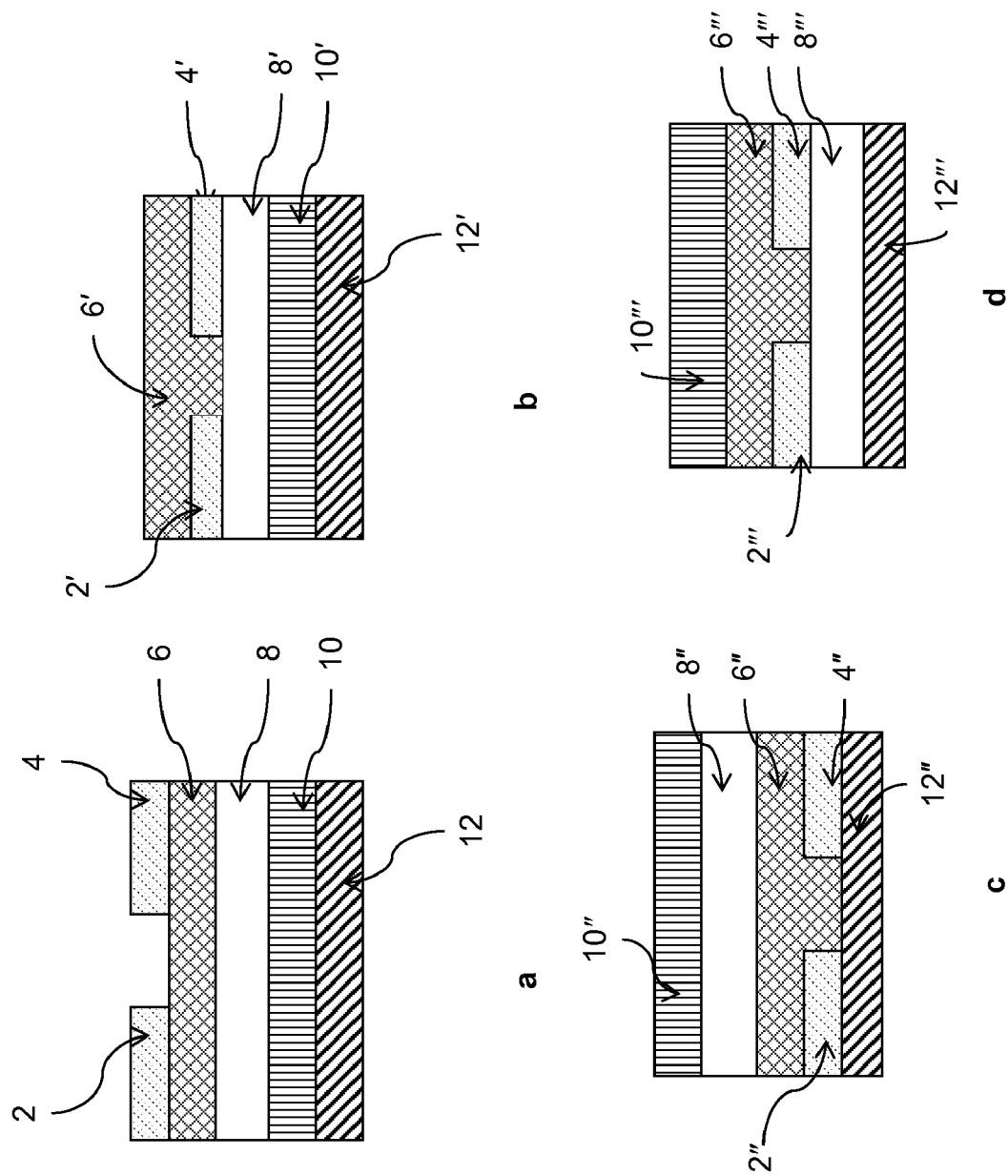
FIG. 16 illustrates different configurations of organic field effect transistors.
Figure 17:
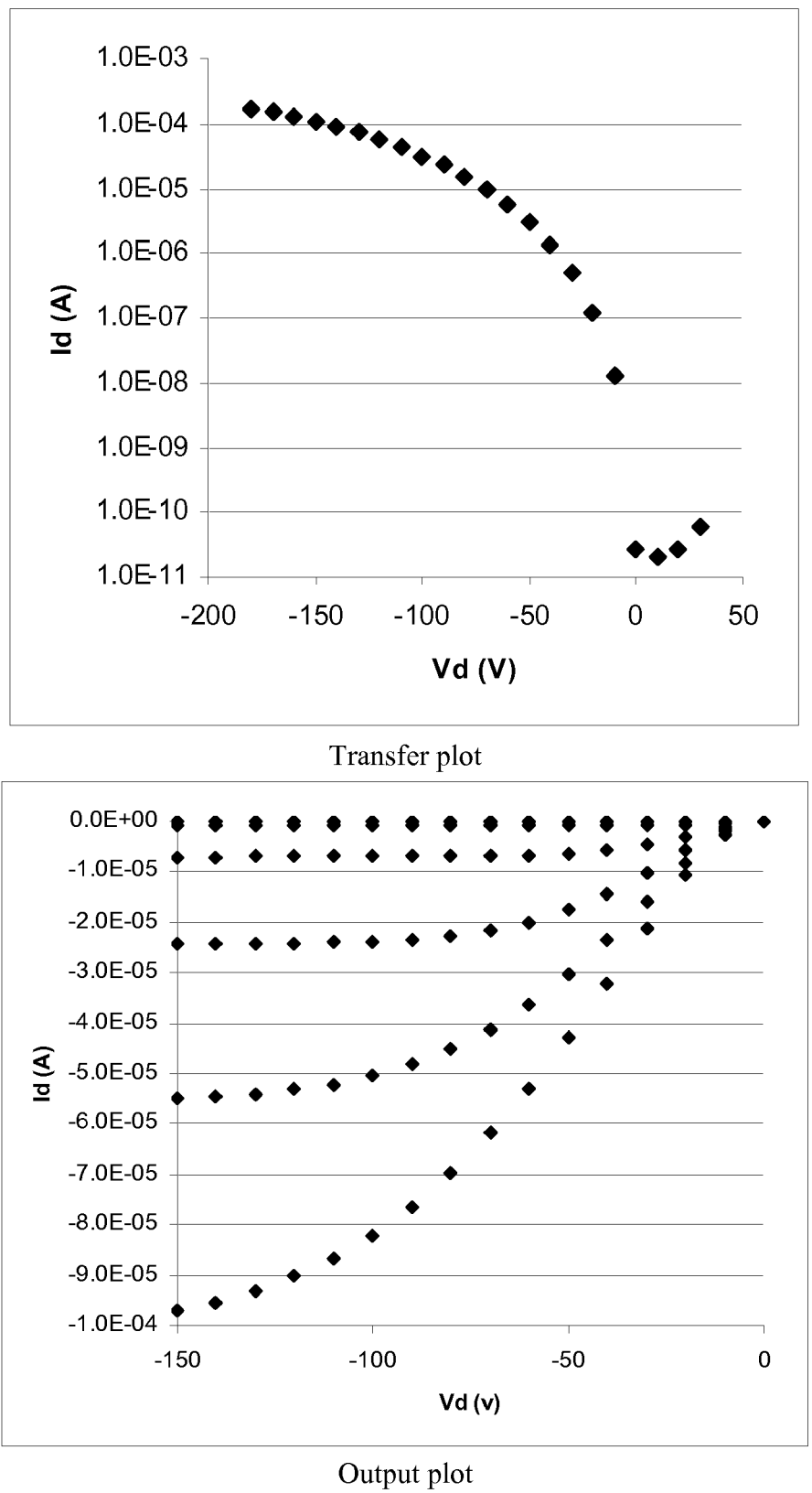
FIG. 17 provides representative transfer and output plots of a bottom-contact bottom-gate organic field effect transistor that incorporates a spin-coated dielectric material of the present teachings and a vapor-deposited semiconductor layer prepared from pentacene.

FIG. 16 illustrates the four common types of OFET structures: top-contact bottom-gate structure (a), bottom-contact bottom-gate structure (b), bottom-contact top-gate structure (c), and top-contact top-gate structure (d). As shown in FIG. 16, an OFET can include a dielectric layer (e.g., shown as 8, 8', 8'', and 8''' in FIGS. 16a, 16b, 16c, and 16d, respectively), a semiconductor layer (e.g., shown as 6, 6', 6'', and 6''' in FIGS. 16a, 16b, 16c, and 16d, respectively), a gate contact (e.g., shown as 10, 10', 10'', and 10''' in FIGS. 16a, 16b, 16c, and 16d, respectively), a substrate (e.g., shown as 12, 12', 12'', and 12''' in FIGS. 16a, 16b, 16c, and 16d, respectively), and source and drain contacts (e.g., shown as 2, 2', 2'', 2''', 4, 4', 4'', and 4''' in FIGS. 16a, 16b, 16c, and 16d, respectively). Most of the OFET devices demonstrated in the previous examples have top-contact bottom-gate structures. In this example, bottom-contact bottom-gate OFETs were fabricated using a dielectric material of the present teachings [P(CyEMA) in Example 2] as the insulating layer. First, a dielectric film was fabricated on a Si substrate with a thickness of about 900 nm. Au (25 nm) was evaporated onto the photopolymer film through a shadow mask to form source and drain electrodes, which were then treated in saturated alkylthiol ethanol solution for 1 hour. Pentacene (50 nm) was then evaporated on top (the substrate temperature was 60° C.) to complete the bottom-contact device. The transfer and output plots of such a bottom-contact device are shown in FIG. 17. Hole mobility of about $0.074$ cm$^2$/Vs and an $I_{on}/I_{off}$ ratio of about $1 \times 10^7$ were obtained.

Example 27

Bottom-Contact Top-Gate OFETs with a Photopolymer Dielectric Layer

Figure 18:
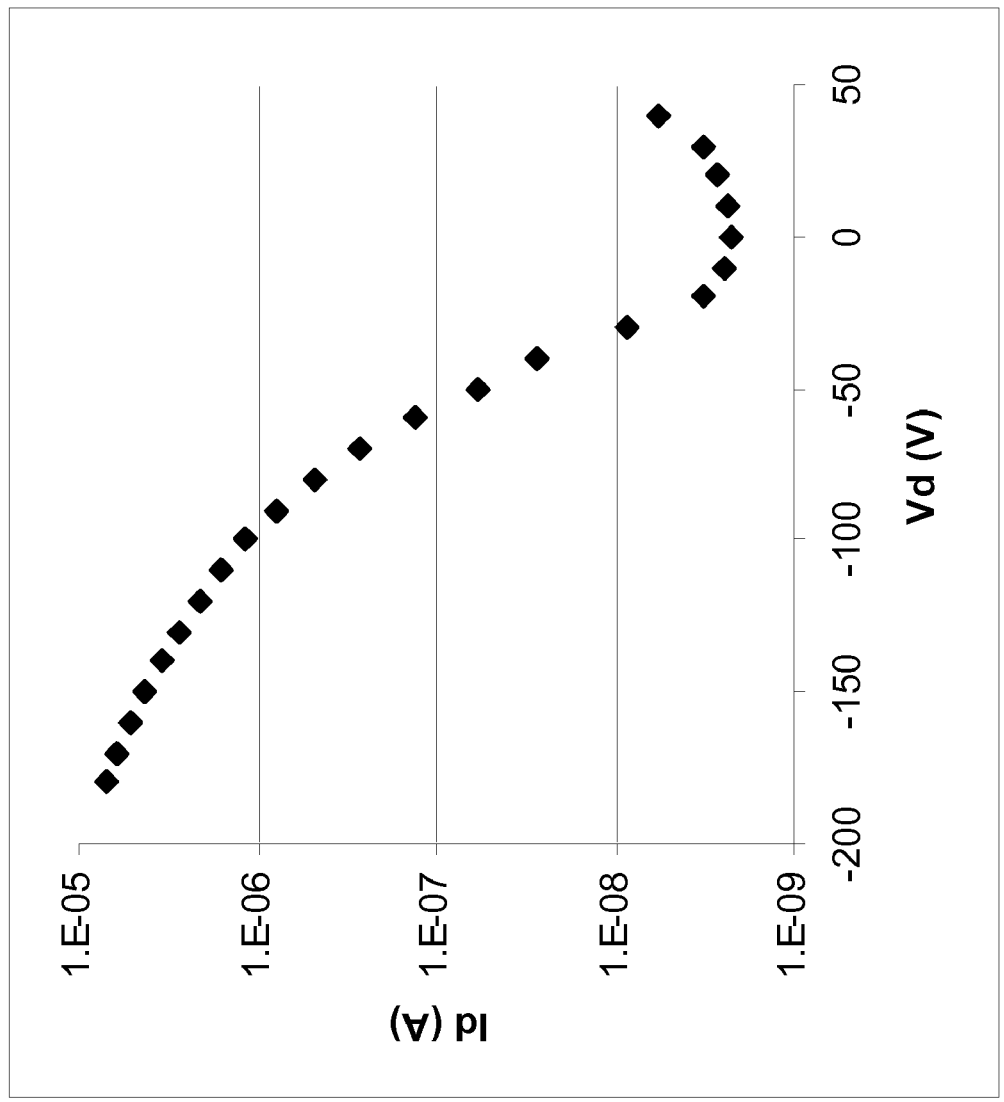
FIG. 18 provides a representative transfer plot of a bottom-contact top-gate organic field effect transistor that incorporates a spin-coated dielectric material of the present teachings and a vapor-deposited semiconductor layer prepared from pentacene.

In this example, bottom-contact top-gate OFETs were fabricated using a dielectric material of the present teachings [P(CyEMA) from Example 2] as the dielectric layer. First, Au (25 nm) was evaporated onto an insulating substrate (SiO$_2$) through a shadow mask to form source and drain electrodes, which were then treated in saturated alkylthiol ethanol solution for 1 hour. Second, pentacene (50 nm) was evaporated on top to form the semiconductor layer. Photopolymer films were then spin-coated on top of pentacene as the dielectric layer followed by deposition of Au as the gate electrode. The transfer plot of such a bottom-contact top-gate device is shown in FIG. 18. Hole mobility of about 0.01 cm$^2$/Vs and an $I_{on}/I_{off}$ ratio of about $3 \times 10^3$ were obtained.

Example 28

Figure 19:
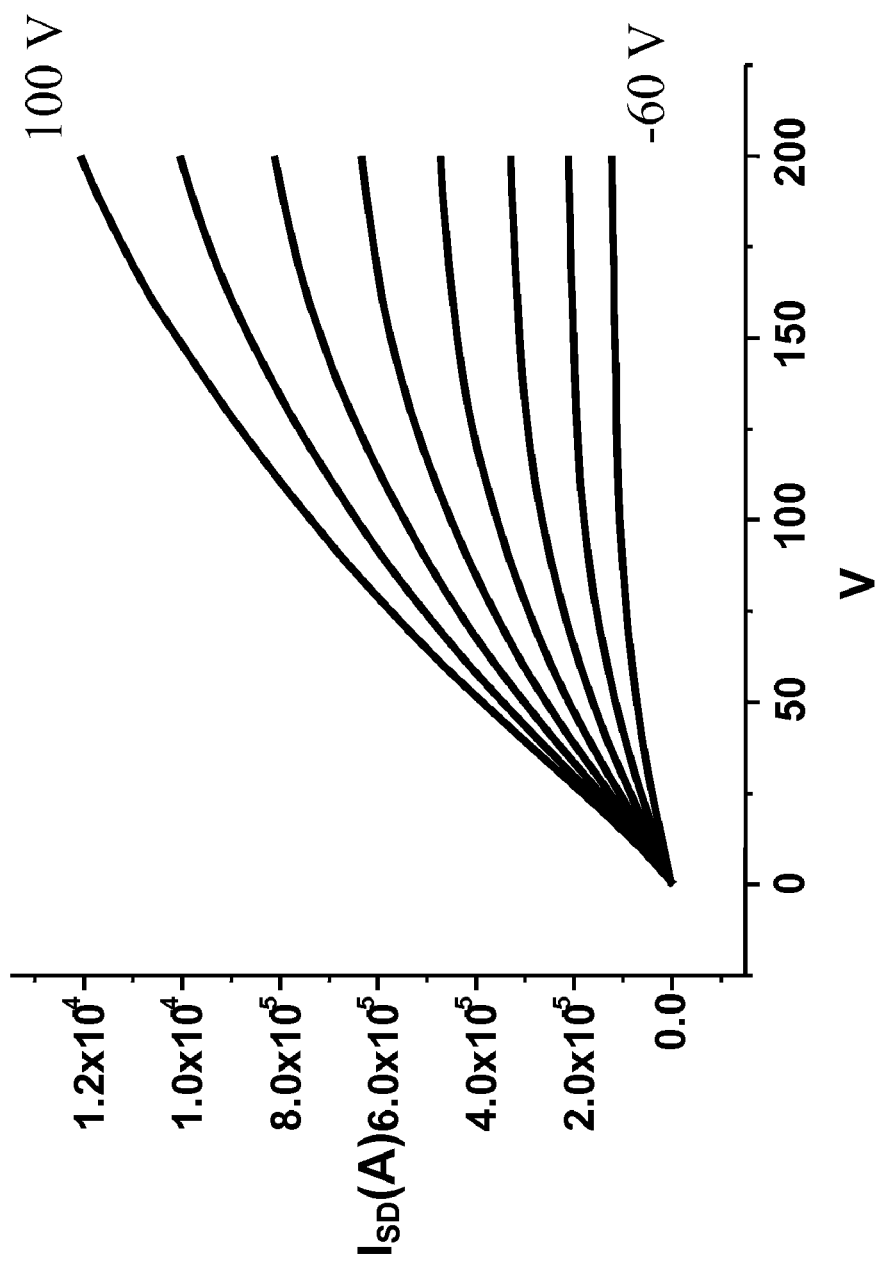
FIG. 19 provides a representative output plot of a top-contact bottom-gate organic field effect transistor that incorporates a spin-coated dielectric material of the present teachings and a conducting polymer as the bottom-gate electrode.

Top-Contact OFETs with a Photopolymer Dielectric Layer and a Conducting Polymer as the Bottom-Gate Electrode In this example, top-contact OFETs were fabricated using a dielectric material of the present teachings [P(CyVP$_{0.55}$-co-MMA$_{0.45}$) from Example 3] as the dielectric layer and a conducting polymer thin film as the bottom-gate electrode. First, a conducting polymer (PEDOT-PSS, 1:1 ratio) was spin-coated on a 3M™ overhead transparency to form the gate electrode. Dielectric and semiconductor layers (n-type semiconductor, N,N'-bis(n-octyl)-dicyanonaphthalene-3,4:9,10-bis(dicarboximide), NDI-8CN$_2$) were then deposited using procedures similar to those described in Example 14. Au (25 nm) was evaporated onto the semiconductor layer to complete the top source and drain electrodes. The OFET characteristics (output plot) of such a top-contact bottom-gate device are shown in FIG. 19. Electron mobility of about 0.03 cm$^2$/Vs and an $I_{on}/I_{off}$ ratio of about 10 were obtained.

The present teachings can be embodied in other specific forms without departing from the spirit or essential characteristics thereof. The foregoing embodiments are therefore to be considered in all respects illustrative rather than limiting on the present teachings described herein. The scope of the present teachings is thus indicated by the appended claims rather than by the foregoing description, and all changes that come within the meaning and range of equivalency of the claims are intended to be embraced therein.

What is claimed is:

1. An organic thin film transistor comprising a semiconductor layer, a polymeric layer in contact with the semiconductor layer, a gate electrode, a source electrode and a drain electrode, wherein the semiconductor layer comprises an organic semiconductor compound, and the polymeric layer consists of a photocrosslinked product of a homopolymer of the repeating unit:

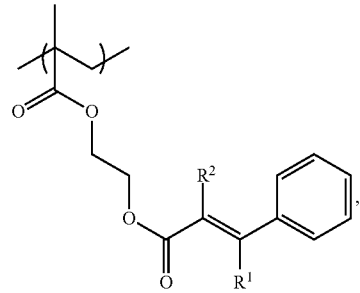

wherein R$^1$ and R$^2$ independently are selected from H and F; and the phenyl group optionally is substituted with 1-5 substituents independently selected from the group consisting of a C$_{1-20}$ alkyl group, a C$_{1-20}$ haloalkyl group, a C$_{1-20}$ alkoxy group, and a —O—C$_{1-20}$ haloalkyl group; and the organic thin film transistor exhibits a mobility of at least about 0.01 cm$^2$/Vs and an $I_{on}/I_{off}$ ratio of at least about $10^3$.

2. The organic thin film transistor of claim 1, wherein R$^1$ is F and R$^2$ is H.

3. The organic thin film transistor of claim 1, wherein R$^1$ is H and R$^2$ is F.

4. The organic thin film transistor of claim 1, wherein each of R$^1$ and R$^2$ is H.

5. The organic thin film transistor of claim 1, wherein each of R$^1$ and R$^2$ is F.

6. The organic thin film transistor of claim 1, wherein the organic thin film transistor is an organic field-effect transistor (OFET).

7. The organic thin film transistor of claim 6, wherein the organic thin film transistor is a bottom-contact bottom-gate OFET.

8. The organic thin film transistor of claim 6, wherein the organic thin film transistor is a bottom-contact top-gate OFET.

9. The organic thin film transistor of claim 1 comprising a substrate, wherein the polymeric layer is deposited on the substrate, and the semiconductor layer is deposited on the polymeric layer.

10. The organic thin film transistor of claim 9, wherein the substrate is selected from indium tin oxide (ITO), ITO-coated glass, and ITO-coated polyimide.

* * * * *